United States Patent
Yumiki

(10) Patent No.: US 8,350,945 B2
(45) Date of Patent: Jan. 8, 2013

(54) CAMERA BODY USED IN AN IMAGING DEVICE WITH WHICH THE STATE OF AN OPTICAL SYSTEM IS VERIFIED BY AN OPERATION MEMBER

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 346 days.

(21) Appl. No.: 12/680,764

(22) PCT Filed: Oct. 7, 2008

(86) PCT No.: PCT/JP2008/002831
§ 371 (c)(1),
(2), (4) Date: Mar. 30, 2010

(87) PCT Pub. No.: WO2009/050860
PCT Pub. Date: Apr. 23, 2009

(65) Prior Publication Data
US 2010/0208122 A1   Aug. 19, 2010

(30) Foreign Application Priority Data

Oct. 15, 2007 (JP) ................. 2007-267588
Oct. 29, 2007 (JP) ................. 2007-279877

(51) Int. Cl.
  *H04N 5/222* (2006.01)
  *H04N 5/232* (2006.01)
  *G03B 13/00* (2006.01)
(52) U.S. Cl. ................. 348/333.02; 348/346
(58) Field of Classification Search ............. 348/240.99, 348/204.1, 204.2, 204.3, 345, 346, 347, 333.01, 348/333.02, 333.03
See application file for complete search history.

(56) References Cited

U.S. PATENT DOCUMENTS

| | | | | |
|---|---|---|---|---|
| 3,904,279 A | * | 9/1975 | Sanada | 359/827 |
| 4,716,429 A | * | 12/1987 | Misawa | 396/147 |
| 4,717,933 A | | 1/1988 | Ando et al. | |
| 4,774,536 A | * | 9/1988 | Inoue et al. | 396/60 |
| 4,829,333 A | * | 5/1989 | Inoue et al. | 396/60 |
| 5,196,879 A | * | 3/1993 | Hata | 396/82 |
| 5,258,802 A | * | 11/1993 | Arimoto et al. | 396/79 |

(Continued)

FOREIGN PATENT DOCUMENTS

JP   61-067840   4/1986

(Continued)

OTHER PUBLICATIONS

International Search Report of PCT Application No. PCT/JP2008/002831, dated Dec. 16, 2008.

*Primary Examiner* — Nicholas Giles
(74) *Attorney, Agent, or Firm* — Panasonic Patent Center

(57) ABSTRACT

A camera body (3) includes a display unit (20) and a body microcomputer (10). The display unit (20) is able to display a zoom display bar (105) that expresses the focal length of the optical system (L). The body microcomputer (10) controls the display unit (20) so that the direction in which a zoom ring (64) moves when the user operates the zoom ring (64) substantially coincides with a change direction in which the zoom display bar (105) shown on the display unit (20) changes according to the operation of the zoom ring (64).

16 Claims, 24 Drawing Sheets

U.S. PATENT DOCUMENTS

| | | | |
|---|---|---|---|
| 5,278,601 A * | 1/1994 | Kawanami | 396/87 |
| 5,506,654 A * | 4/1996 | Kim | 396/147 |
| 5,521,671 A * | 5/1996 | Aoki et al. | 396/281 |
| 5,594,517 A * | 1/1997 | Tsunefuji | 396/87 |
| 5,614,980 A * | 3/1997 | Wakabayashi et al. | 396/147 |
| 5,708,881 A * | 1/1998 | Tsukahara et al. | 396/281 |
| 5,786,853 A * | 7/1998 | Ohkawara et al. | 348/240.3 |
| 5,794,086 A * | 8/1998 | Wakabayashi et al. | 396/284 |
| 6,275,212 B1 * | 8/2001 | Ohtani et al. | 345/110 |
| 6,356,307 B2 * | 3/2002 | Ohkawara et al. | 348/360 |
| 6,865,036 B1 * | 3/2005 | Kuwakino | 359/824 |
| 7,003,223 B2 * | 2/2006 | Sasaki et al. | 396/103 |
| 7,259,792 B2 * | 8/2007 | Terada | 348/368 |
| 7,324,151 B2 * | 1/2008 | Onozawa | 348/346 |
| 7,551,223 B2 * | 6/2009 | Tanaka | 348/346 |
| 7,583,893 B2 * | 9/2009 | Horii et al. | 396/532 |
| 7,598,997 B2 * | 10/2009 | Shiraishi | 348/353 |
| 7,876,373 B2 * | 1/2011 | Ochi et al. | 348/333.01 |
| 2001/0048479 A1 * | 12/2001 | Ohkawara et al. | 348/360 |
| 2003/0011692 A1 * | 1/2003 | Shore et al. | 348/240.3 |
| 2004/0165879 A1 * | 8/2004 | Sasaki et al. | 396/137 |
| 2004/0189856 A1 * | 9/2004 | Tanaka | 348/345 |
| 2005/0057677 A1 * | 3/2005 | Hagiwara et al. | 348/333.01 |
| 2005/0168620 A1 * | 8/2005 | Shiraishi | 348/345 |
| 2005/0219405 A1 * | 10/2005 | Ichihara | 348/370 |
| 2006/0029381 A1 * | 2/2006 | Onozawa | 396/147 |

FOREIGN PATENT DOCUMENTS

| | | |
|---|---|---|
| JP | 01-280711 | 11/1989 |
| JP | 05-153456 | 6/1993 |
| JP | 05-153462 | 6/1993 |
| JP | 05-181047 | 7/1993 |
| JP | 07-5138 | 1/1995 |
| JP | 07-064165 | 3/1995 |
| JP | 10-010630 | 1/1998 |
| JP | 2001-125173 | 5/2001 |
| JP | 2005-215366 | 8/2005 |
| JP | 2005-215574 | 8/2005 |
| JP | 2005-229145 | 8/2005 |
| JP | 2005-266675 | 9/2005 |
| JP | 2006-201695 | 8/2006 |

* cited by examiner

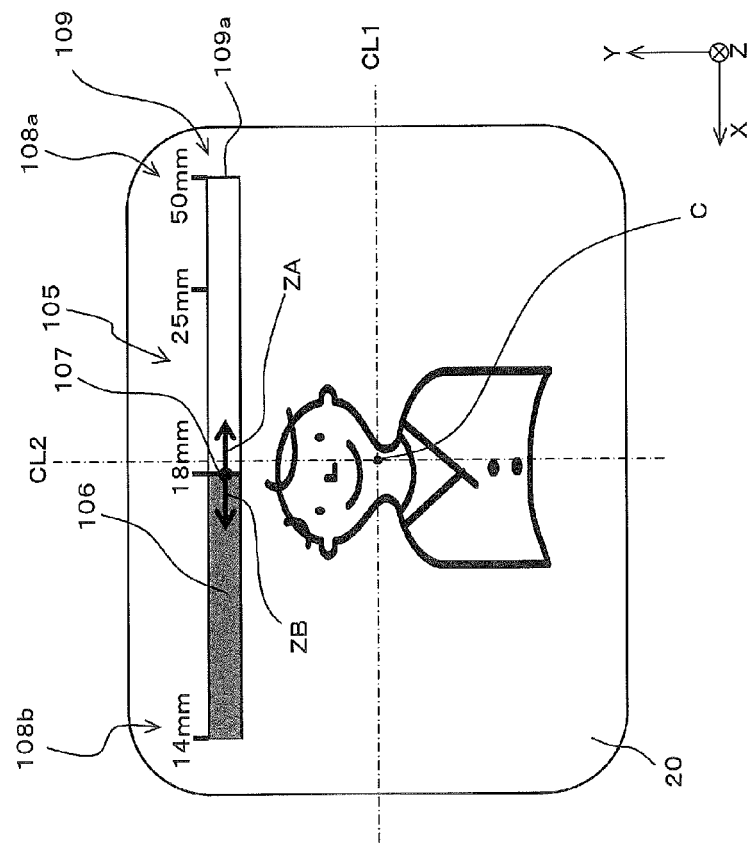
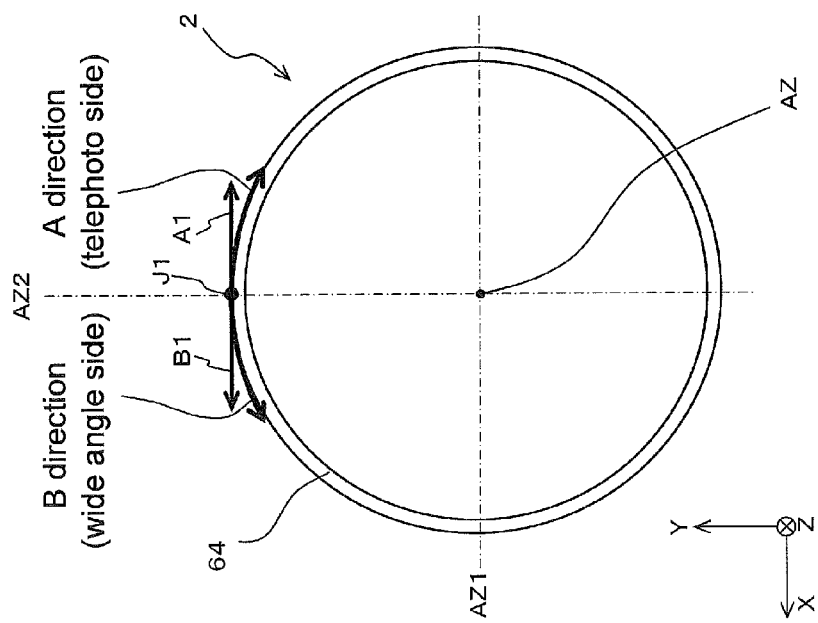
FIG. 12B
FIG. 12A

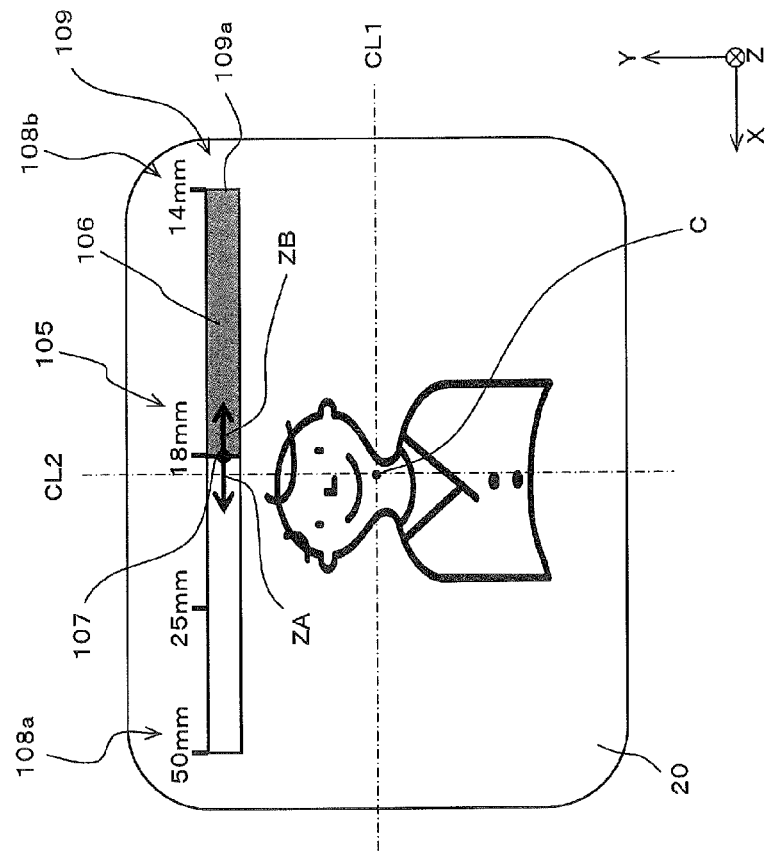
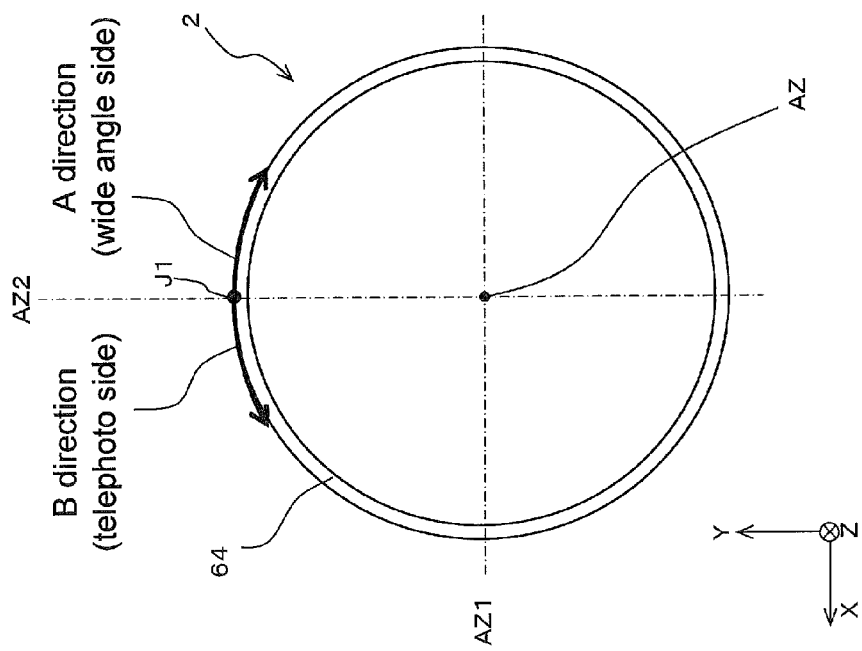
FIG. 14B
FIG. 14A

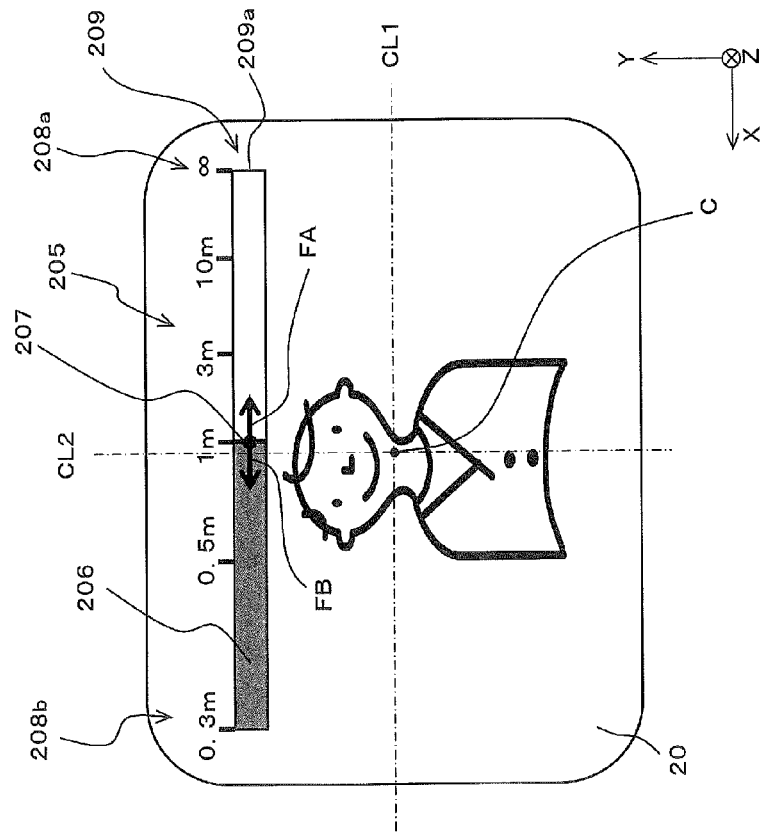
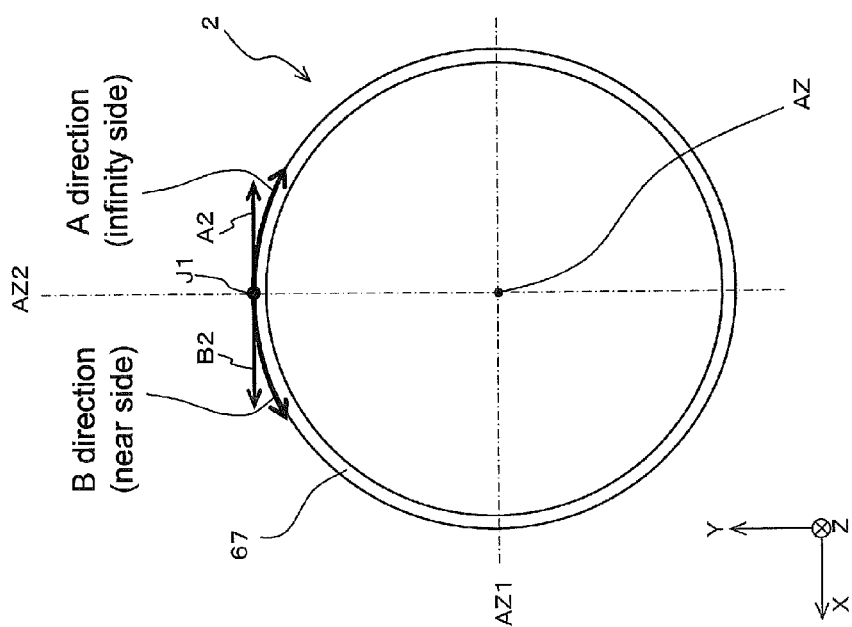
FIG. 19A
FIG. 19B

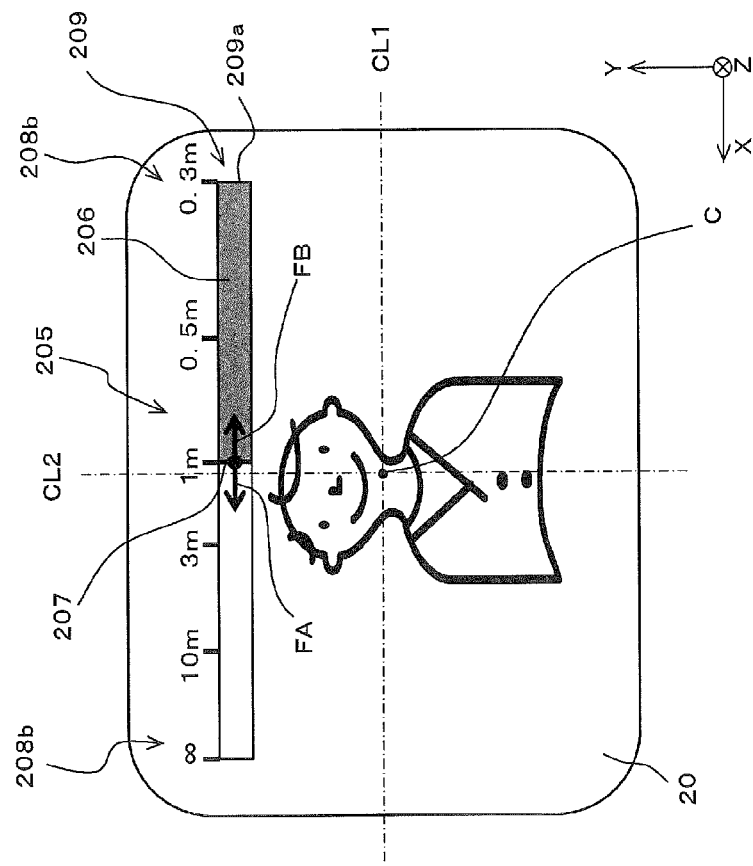
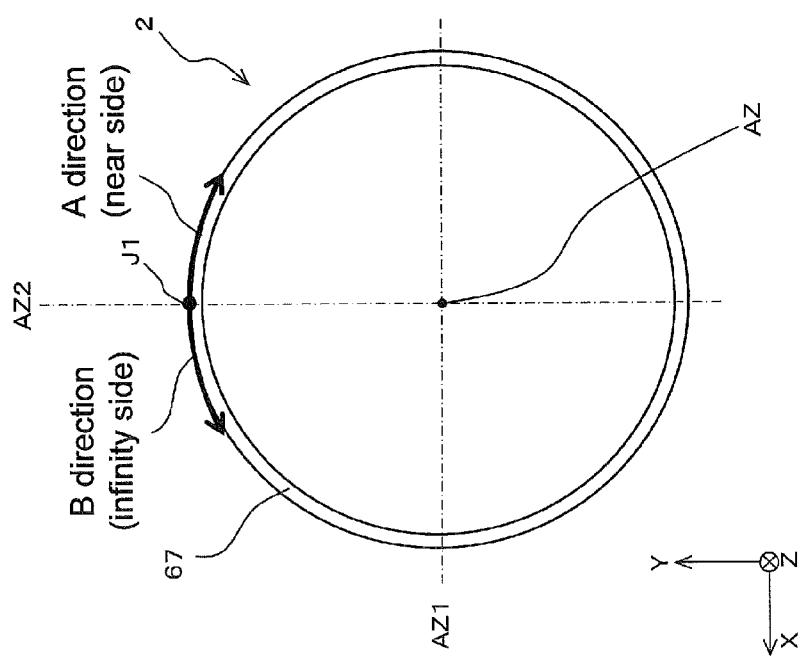

CAMERA BODY USED IN AN IMAGING DEVICE WITH WHICH THE STATE OF AN OPTICAL SYSTEM IS VERIFIED BY AN OPERATION MEMBER

CROSS-REFERENCE TO RELATED APPLICATIONS

This U.S. National stage application claims priority under 35 U.S.C. §119(a) to Japanese Patent Application No. 2007-267588, filed in Japan on Oct. 15, 2007, and Japanese Patent Application No. 2007-279877, filed in Japan on Oct. 29, 2007, the entire contents of which are hereby incorporated herein by reference.

TECHNICAL FIELD

The technology disclosed herein relates to an imaging device with which the state of the optical system can be varied.

BACKGROUND ART

Digital cameras with interchangeable lenses have surged in popularity in recent years. With these digital cameras, when the user looks at a subject through a viewfinder, the optical path is varied by a reflecting mirror. More specifically, light that has passed through the optical system (that is, the subject image) is reflected by a reflecting mirror disposed along the optical path. The reflected light goes through a pentaprism, etc., and is converted into an erected image, then guided to an optical viewfinder. This allows the user to see the subject image that has passed through the optical system by looking into the optical viewfinder. Therefore, the position at which the viewfinder optical path is formed is usually the home position of the reflecting mirror.

On the other hand, when a lens is used for imaging, the reflecting mirror instantly changes its position and is retracted from the imaging optical path, which switches the viewfinder optical path to the imaging optical path, and the reflecting mirror instantly returns to its home position upon completion of the imaging. This system is the same for both conventional silver halide cameras and digital cameras, if they are single lens reflex types.

A feature of a digital camera is that an image is captured while the user looks at a display device (such as a liquid crystal monitor), and the captured image can be checked right after it is captured. However, when a conventional single lens reflex reflecting mirror is used, a liquid crystal monitor cannot be used during imaging. Since imaging cannot be performed by using a liquid crystal monitor, the user has to look through the viewfinder during imaging, so conventional camera systems have been extremely difficult to use, especially for novices who are inexperienced in using digital cameras. There is also a need for functions such as moving picture imaging, rather than just still picture imaging.

In view of this, there has been a proposal for a digital single lens reflex camera with which imaging can be performed while looking at a liquid crystal monitor (see Patent Citation 1, for example).

However, with an interchangeable lens type of digital camera, when an image is captured using a liquid crystal monitor, since the user is farther away from the digital camera than when imaging is performed by looking into a viewfinder as in the past, it is difficult for the user to operate the camera while looking directly at the interchangeable lens. Also, the numerical value that indicates the state of the zoom ring or focus ring is sometimes eliminated in order to make a digital camera smaller. In this case, when the user attempts to change the zoom magnification (focal length) or the object distance (hereinafter also referred to as the subject distance), it is hard to tell which way the operation member of the interchangeable lens should be moved, and this makes the camera more difficult to operate.

In view of this, there has been a proposal for a digital camera in which the direction in which the zoom lever is operated and the zoom position are displayed on a display unit by using text or a character pattern (see Patent Citation 2, for example).

Also, there has been a proposal for a digital camera with which the operation direction of the focus ring can be selected as desired (see Patent Citation 3, for example).

Patent Citation 1: Japanese Laid-Open Patent Application 2001-125173
Patent Citation 2: Japanese Laid-Open Patent Application H5-153456
Patent Citation 3: Japanese Laid-Open Patent Application H5-181047

DISCLOSURE OF INVENTION

However, with the digital camera discussed in Patent Citation 2, although the direction in which the zoom lever is operated and the zoom position are displayed on a display unit, the display of the operation direction is not correlated to the operation direction of the zoom lever, so even if the user looks at the display of the zoom position, it is hard to tell which way the zoom lever should be operated.

Also, with the digital camera discussed in Patent Citation 3, this merely allows the operation direction of the focus ring to be selected as desired, and it is still hard for the user to confirm the relationship between the operation direction of the focus ring and the increase or decrease in the object distance.

As explained above, with a conventional imaging device, there is a need for easier operation since it is hard for the user to confirm which way to operate the controls in changing the state of the optical system.

It is an object to provide a camera body and an imaging device with which operation is easier.

A camera body disclosed herein is used in an imaging device along with a lens barrel with which the state of the optical system can be varied by operating a rotatably provided operation member. This camera body comprises a display unit and a control unit. The display unit is configured to display a state indicator that expresses the state of the optical system. The control unit is configured to controls the display unit so that an operation direction in which the operation member moves when the user operates the operation member substantially coincides with a change direction in which the state indicator displayed on the display unit changes according to the operation of the operation member.

With this camera body, the display unit is controlled by the control unit so that the direction in which the operation member moves substantially coincides with a change direction in which the state indicator displayed on the display unit changes according to the operation of the operation member. Accordingly, if the user captures an image while looking at the state indicator displayed on the display unit, the user can intuitively tell which way to operate the operation member in adjusting the state of the optical system. Consequently, this camera body is easier to operate. Also, the same effect can be obtained with an imaging device having this camera body.

The phrase "state of the optical system" here includes, for example, the focal length of the optical system and the object distance at which the system is focused. A state in which the operation direction and the change direction substantially coincide includes not only a state in which the operation direction and the change direction completely coincide, but also a state in which the operation direction and the change direction are offset within a range over which the effect of facilitating operation can still be obtained. The operation direction and the change direction can be a linear direction, a direction following an arc whose center is a specific reference point, a rotational direction whose center is a specific reference point, and so forth.

BRIEF DESCRIPTION OF DRAWINGS

FIG. 12A is a diagram of the operation direction of the zoom ring,
and FIG. 12B is an example of a zoom display bar;
FIG. 14A is a diagram of the operation direction of the zoom ring,
and FIG. 14B is an example of a zoom display bar;
FIG. 19A is a diagram of the operation direction of the focus ring,
and FIG. 19B is an example of a focus display bar;
FIG. 21A is a diagram of the operation direction of the focus ring,
and FIG. 21B is an example of a focus display bar.

Figure 1:
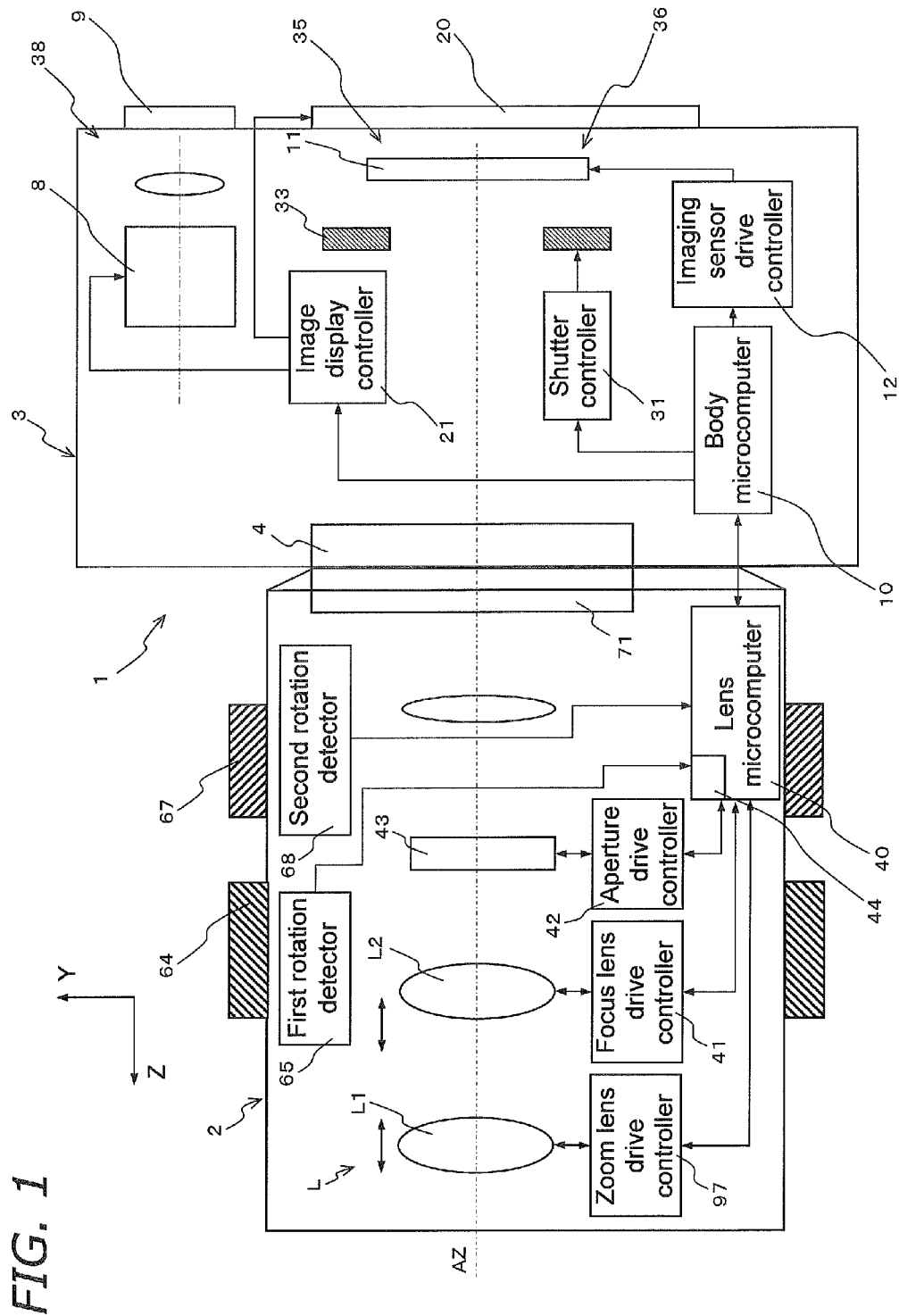
FIG. 1 is a simplified diagram of a digital camera.

EXPLANATION OF REFERENCE 1 digital camera (imaging device)
2 interchangeable lens unit (lens barrel)
3 camera body
3a case
4 body mount
10 body microcomputer (an example of a control unit)
11 image sensor
12 image sensor drive controller
20 display unit
21 image display controller (an example of a control unit)
25 power switch
26 operating mode switching lever
27 cross control key
28 menu setting button
29 set button
30 shutter button
31 shutter controller
33 shutter unit
34 imaging mode switching button
40 lens microcomputer
41 focus lens drive controller
44 memory (an example of a memory unit)
50 fixing frame
52 first linear frame
53 first rotary frame
54 first holder
55 second rotary frame
57 first lens support frame
58 second lens support frame
59 third lens support frame
60 fourth lens support frame
61 second holder
62 filter mount
63 zoom ring unit
64 zoom ring (an example of an operation member)
65 first rotation detector
67 focus ring (an example of an operation member)
68 second rotation detector
71 lens mount
74a, 74b, 74c guide pole
75 third holder
76 magnetic scale
77 magnetic sensor
78 focus lens unit
80 ultrasonic actuator unit
80a movable part
80b fixed part
81 piezoelectric element
82 driver
83 moving body
84 inner case
88 power supply electrode
90 outer case
94 slide plate
97 zoom lens drive controller
105, 125 zoom display bar (an example of a state indicator)
106, 126 display stripe
107, 127 zoom pointer (an example of an pointer)
108a, 128a maximum value (an example of focal length information)
108b, 128b minimum value (an example of focal length information)
109, 129 display meter
109a, 129a meter box
205, 225 focus display bar (an example of a state indicator)
206, 226 display stripe
207, 227 focus pointer (an example of an pointer)
208a, 228a maximum value (an example of object distance information)
208b, 228b minimum value (an example of object distance information)
209, 229 display meter
209a, 229a meter box
L optical system
L1 first lens group
L2 second lens group
L3 third lens group
L4 fourth lens group

BEST MODE FOR CARRYING OUT THE INVENTION

An embodiment of the present invention will now be described in detail through reference to the drawings.

First Embodiment

1: Overall Configuration of Digital Camera

As shown in FIG. 1, a digital camera 1 (an example of an imaging device) is an interchangeable lens type of digital camera, and mainly has a camera body 3 having the primary function of the digital camera 1, and an interchangeable lens unit 2 (an example of a lens barrel) that is removably mounted to the camera body 3. The interchangeable lens unit 2 is mounted to a body mount 4 provided to the front face of the camera body 3, via a lens mount 71 provided to the rearmost part.

1.1: Interchangeable Lens Unit

As shown in FIG. 1, the interchangeable lens unit 2 has an optical system L, a zoom lens drive controller 97, a focus lens drive controller 41, an aperture drive controller 42, a lens microcomputer 40, a first rotation detector 65, and a second rotation detector 68.

The optical system L forms a subject image on an imaging sensor 11 of the camera body 3. The zoom lens drive controller 97 drives a first lens group L1 (discussed below) of the optical system L to vary the focal length. The focus lens drive controller 41 drives a second lens group L2 (discussed below) to perform focusing. The aperture drive controller 42 adjusts the amount of aperture of a aperture unit 43. The lens microcomputer 40 controls the operation of the various components of the interchangeable lens unit 2.

The lens microcomputer 40 is a control device serving as the functional center of the lens unit 2, and is connected to the various components installed in the interchangeable lens unit 2. More specifically, a CPU, ROM, and RAM are installed in the lens microcomputer 40, and the CPU reads the programs loaded in the ROM, which allows the lens microcomputer 40 to carry out its various functions. Also, the body microcomputer 10 and the lens microcomputer 40 are electrically connected by electrical contacts (not shown) provided to the lens mount 71, allowing information to be exchanged between the two.

Various information (lens information) related to the interchangeable lens unit 2 is stored in a memory 44 of the lens microcomputer 40. More specifically, focal length information and object distance information are stored in the memory 44. Focal length information includes the maximum and minimum values for the focal length of the interchangeable lens unit 2. Object distance information includes the maximum and minimum values for the object distance of the interchangeable lens unit 2.

Furthermore, information related to the rotation direction around the optical axis AZ of the zoom ring 64 (discussed below) (the A direction or B direction shown in FIG. 3) and the rotational angle, as well as operation direction information expressing the relation between the rotation direction of the zoom ring 64 and the direction of increasing and decreasing the focal length, are also stored.

Figure 3:
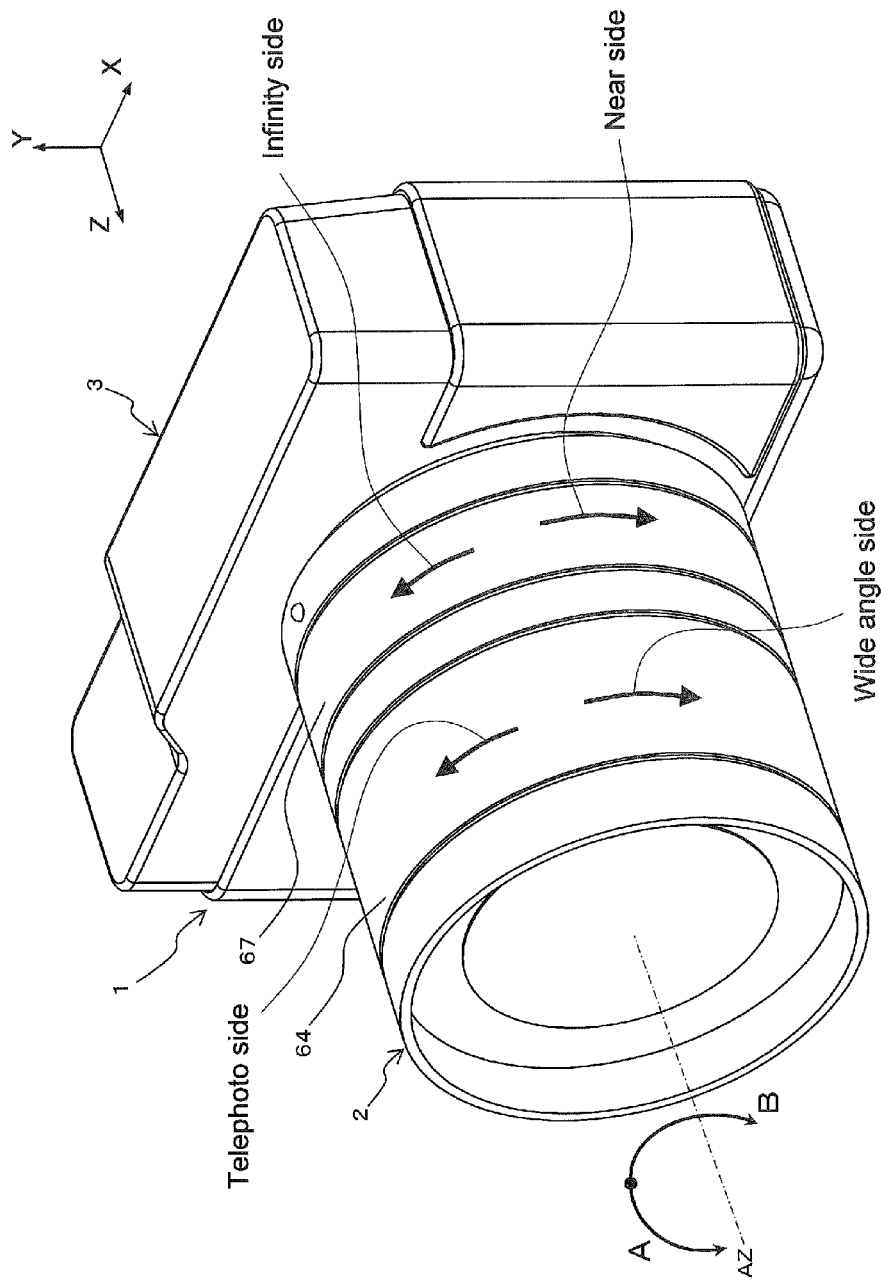
FIG. 3 is an oblique view of a digital camera.

Here, as shown in FIG. 3, for the interchangeable lens unit 2, the clockwise direction when the interchangeable lens unit 2 is viewed from the camera body 3 side along the optical axis AZ shall be termed the A direction, and the counterclockwise direction the B direction.

The various information stored in the memory 44 is sent from the lens microcomputer 40 to the body microcomputer 10 when the interchangeable lens unit 2 is attached to the camera body 3. This allows the body microcomputer 10 to ascertain various kinds of information about the interchangeable lens unit 2. This information is used during imaging.

Figure 5:
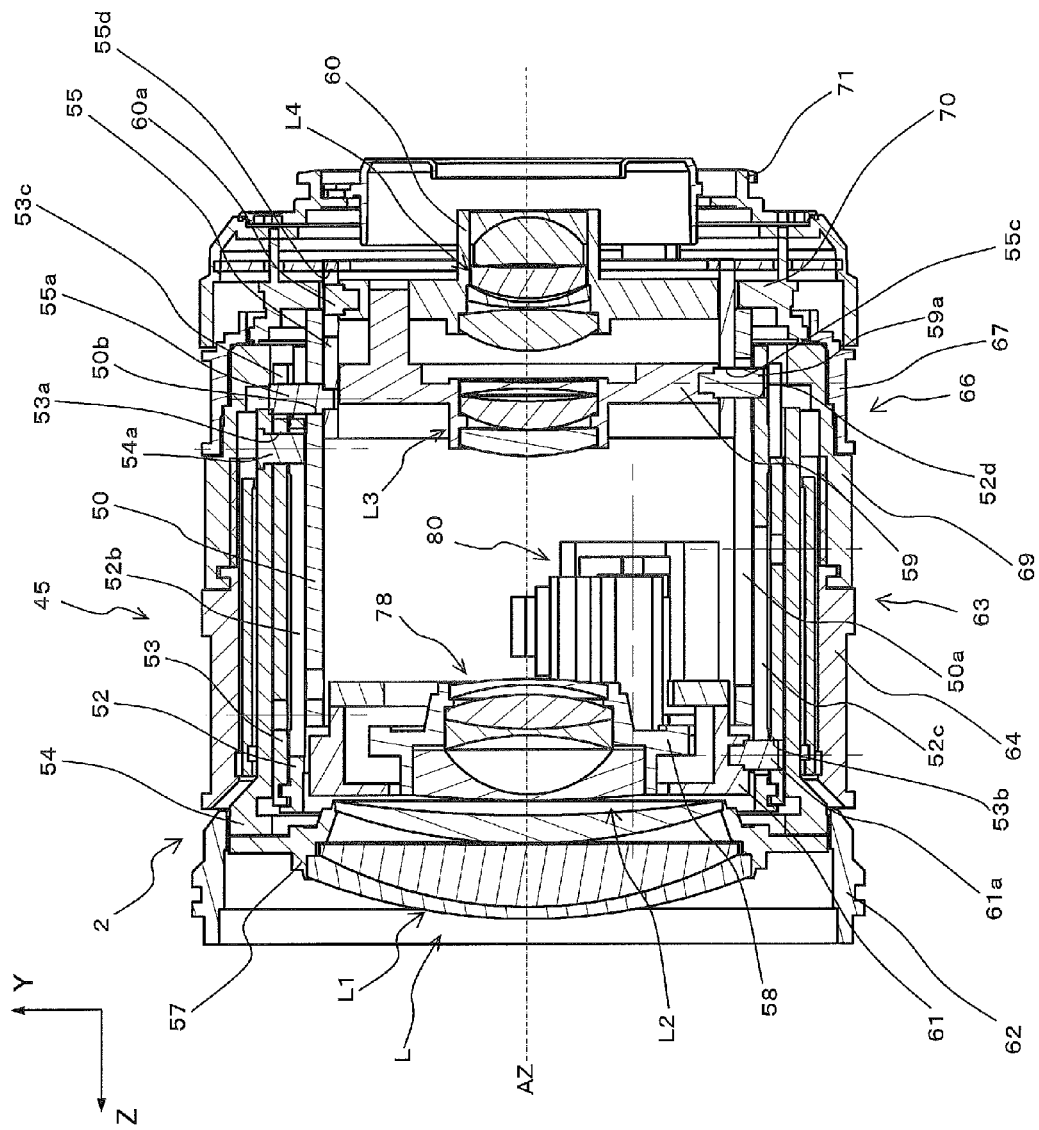
FIG. 5 is a cross section at the wide angle end of an interchangeable lens unit.

The basic structure of the interchangeable lens unit 2 will be described through reference to FIGS. 5 to 10. As shown in FIG. 5, an XYZ three-dimensional rectangular coordinate system is set up in which a direction parallel to the optical axis AZ of the interchangeable lens unit 2 serves as the Z axis direction (the subject side is the positive side, and the image plane side is the negative side).

An optical system L having four lens groups is installed in the interchangeable lens unit 2. More specifically, the interchangeable lens unit 2 has a first lens group L1, a second lens group L2, a third lens group L3, and a fourth lens group L4. To perform zooming, the first lens group L1, the second lens group L2, the third lens group L3, and the fourth lens group L4 move in the Z axis direction along the optical axis AZ. To perform focusing, the second lens group L2 moves in the Z axis direction along the optical axis AZ.

Figure 6:
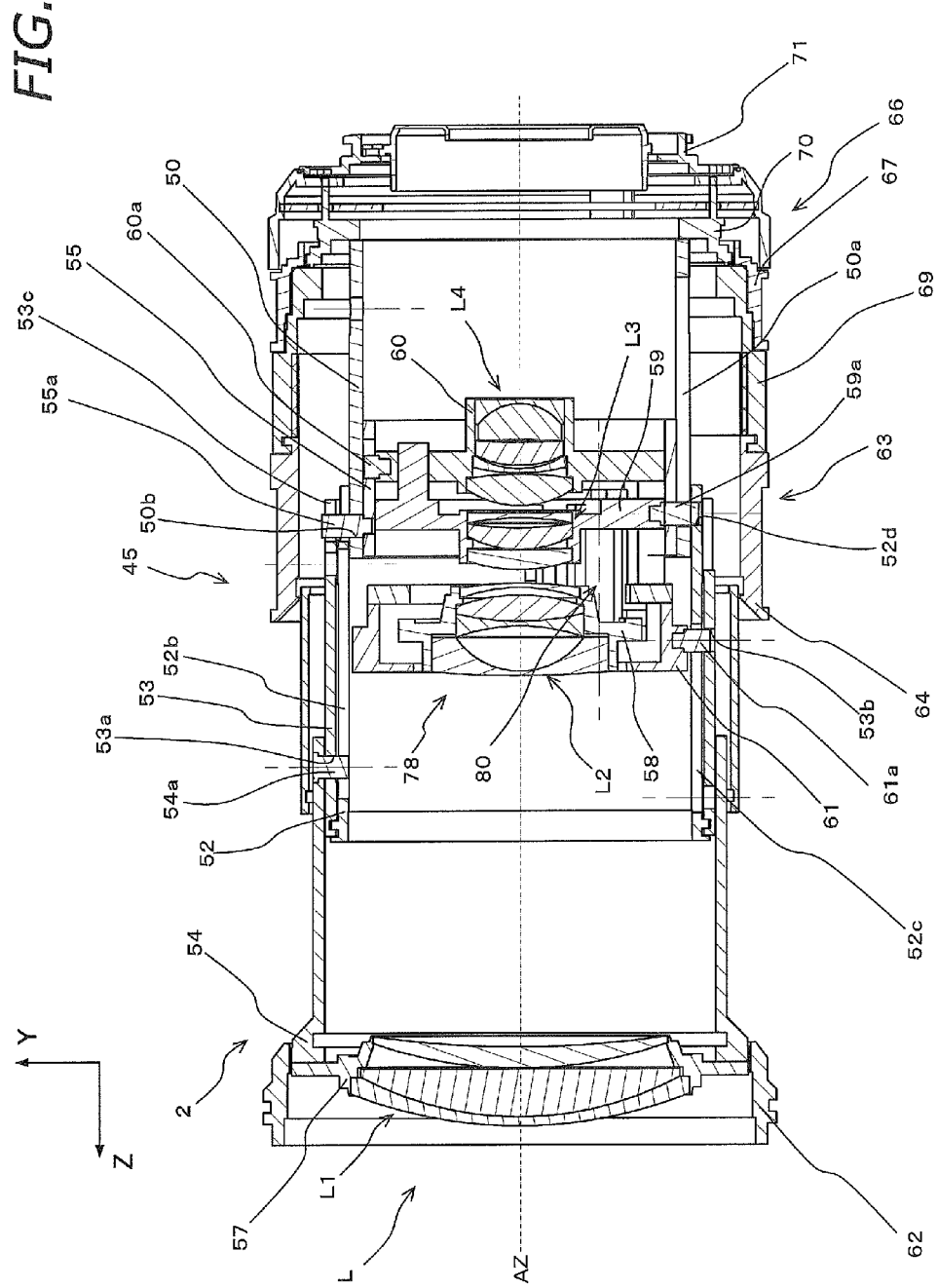
FIG. 6 is a cross section at the telephoto end of an interchangeable lens unit.

The interchangeable lens unit 2 has a lens support mechanism 45 that supports the optical system L. More specifically, as shown in FIGS. 5 and 6, the lens support mechanism 45 has a fixing frame 50, a first linear frame 52, a first rotary frame 53, a first holder 54, a second rotary frame 55, a first lens support frame 57, second lens support frame 58, a third lens support frame 59, a fourth lens support frame 60, a second holder 61, a filter mount 62, a zoom ring unit 63, a focus ring unit 66, and a lens mount 71.

The first rotary frame 53 is disposed coaxially on the outer peripheral side of the first linear frame 52, and is supported by the first linear frame 52 so as to be capable of relative rotation around the optical axis AZ.

The first holder 54 is disposed coaxially on the outer peripheral side of the first rotary frame 53, and its relative rotation around the optical axis AZ is limited by the first linear frame 52. When the first rotary frame 53 rotates around the optical axis AZ, the first holder 54 moves in the Z axis direction without rotating with respect to the first linear frame 52 (while rotating with respect to the first rotary frame 53). Three cam pins 54a disposed at a constant pitch in the circumferential direction (such as at a spacing of 120°) are provided to the portion of the first holder 54 on the negative side in the Z axis direction.

The second holder 61 is disposed coaxially on the inner peripheral side of the first linear frame 52, and its relative rotation around the optical axis AZ is limited by the first linear frame 52. The second holder 61 has three cam pins 61a disposed at a constant pitch in the circumferential direction. The cam pins 61a are inserted in linear through-grooves 52c and cam through-grooves 53b of the first linear frame 52. Accordingly, when the first rotary frame 53 rotates around the optical axis AZ, the second holder 61 moves in the Z axis direction without rotating with respect to the first linear frame 52 (while rotating with respect to the first rotary frame 53).

The first linear frame 52 is disposed coaxially on the outer peripheral side of the fixing frame 50, and is supported by the fixing frame 50, the second rotary frame 55, and the third lens support frame 59. The first linear frame 52 is limited in its relative rotation around the optical axis AZ by the fixing frame 50. When the first rotary frame 53 rotates around the optical axis AZ, the first linear frame 52 moves in the Z axis direction without rotating with respect to the fixing frame 50.

The second rotary frame 55 is disposed coaxially on the inner peripheral side of the fixing frame 50, and is supported by the fixing frame 50. When the first rotary frame 53 rotates around the optical axis AZ, the second rotary frame 55 moves in the Z axis direction while rotating around the optical axis AZ with respect to the fixing frame 50.

The third lens support frame 59 is disposed coaxially on the inner peripheral side of the second rotary frame 55, and is limited in its relative rotation around the optical axis AZ by the fixing frame 50. When the first rotary frame 53 rotates around the optical axis AZ, the third lens support frame 59 moves in the Z axis direction without rotating with respect to the fixing frame 50.

The fourth lens support frame 60 is disposed coaxially on the inner peripheral side of the second rotary frame 55, and is limited in its relative rotation around the optical axis AZ by the third lens support frame 59. When the first rotary frame 53 rotates around the optical axis AZ, the fourth lens support frame 60 moves in the Z axis direction without rotating with respect to the third lens support frame 59.

The first lens support frame 57 is fixed to the end of the first holder 54, and supports the first lens group L1. The second lens support frame 58 supports the second lens group L2. The second lens support frame 58 is provided with an ultrasonic actuator unit 80 (discussed below), and an anti-rotation part 58a disposed at a position on the approximately opposite side on the circumference thereof.

The third lens support frame 59 supports the third lens group L3, and has three cam pins 59a disposed at a constant pitch in the circumferential direction (such as at a spacing of 120°). The fourth lens support frame 60 supports the fourth lens group L4, and has cam pins 60a disposed at a constant pitch in the circumferential direction (such as at a spacing of 120°).

The first rotary frame 53 is a cylindrical cam ring, and has three cam through-grooves 53a and 53b that are inclined with respect to the optical axis AZ. Cam pins 54a of the first holder 54 are inserted into the cam through-grooves 53a. The cam pins 61a of the second holder 61 are inserted into the cam through-grooves 53b. Three slots 53c, into which cam pins 55a of the second rotary frame 55 are inserted, are provided to the end of the first rotary frame 53. The cam pins 55a include one long pin and two short pins, and only the long pin is inserted into the slots 53c.

The first linear frame 52 is a cylindrical cam ring, and three linear through-grooves 52b are formed, into which are inserted the cam pins 54a of the first holder 54. The three linear through-grooves 52c, into which the cam pins 61a of the second holder 61 are inserted, are formed at positions that do not interfere with the linear through-grooves 52b. Through-holes 52d, into which are inserted the cam pins 59a provided to the third lens support frame 59, are provided at the end of the first linear frame 52 in order to move the first linear frame 52 in the Z axis direction integrally with the third lens support frame 59.

Three linear through-grooves 50a for moving the first linear frame 52 in the Z axis direction are formed in the fixing frame 50. Three cam through-grooves 50b, which are inclined with respect to the optical axis AZ, are formed at a constant pitch in the circumferential direction (such as at a spacing of 120°), in a portion of the fixing frame 50 where they will not interfere with the linear through-grooves 50a, in order to move the second rotary frame 55 in the Z axis direction.

Three cam through-grooves 55c, which are inclined with respect to the Z axis direction and engage with the cam pins 59a of the third lens support frame 59, are formed at a constant pitch in the circumferential direction (such as at a spacing of 120°) in the second rotary frame 55. Three cam through-grooves 55d, which are inclined with respect to the Z axis direction and engage with the cam pins 60a of the fourth lens support frame 60, are formed at a constant pitch in the circumferential direction (such as at a spacing of 120°) in the second rotary frame 55.

The filter mount 62 is cylindrical, and has female threads formed on the Z axis direction positive side (the subject side). A polarizing filter, protective filter, or other such optical filter, and a conversion lens are attached to the female threads. The filter mount 62 is fixed to the first holder 54 by three attachment screws.

The zoom ring unit 63 has the zoom ring 64 and the first rotation detector 65 (FIG. 1) that detects the rotational angle of the zoom ring 64. The zoom ring 64 is cylindrical in shape, and is supported by a ring base 69 so as to be able to rotate around the optical axis AZ in a state in which its movement is limited in the Z axis direction with respect to the ring base 69 fixed to the fixing frame 50. In this embodiment, the zoom ring 64 rotates approximately 90°. The rotational angle of the zoom ring 64 is not limited to being 90°.

A depression (not shown) is formed in the inner peripheral part of the zoom ring 64. A convex part (not shown) provided to the outer peripheral part of the first rotary frame 53 is inserted into the depression. With this constitution, the zoom ring 64 is rotatable around the optical axis AZ with respect to the first rotary frame 53, but is limited in its movement in the Z axis direction with respect to the first rotary frame 53.

The first rotation detector 65 detects the rotational angle and rotation direction made to the zoom ring 64 by the user, and sends the detected rotational angle and rotation direction to the lens microcomputer 40 as focal length information. Also, the focal length of the optical system is displayed on the outer periphery of the zoom ring 46. As to the absolute positions of the various lens groups (the first to fourth lens groups L1 to L4), since there is a one-to-one correspondence with the rotational angle of the zoom ring 64, these positions can be detected by the first rotation detector 65 used to detect the absolute angle of the zoom ring 64.

The focus ring unit 66 has a focus ring 67 and the second rotation detector 68 (FIG. 1) that detects the rotational angle of the focus ring 67. The focus ring 67 is cylindrical in shape, and is supported by the ring base 69 so as to be able to rotate around the optical axis AZ in a state in which its movement is limited in the Z axis direction with respect to the ring base 69 fixed to the fixing frame 50.

The second rotation detector 68 is able to detect the rotational angle and rotation direction of the focus ring 67. This second rotation detector 68 detects the rotational angle and rotation direction of the focus ring 67 by detecting the passage of protrusions formed in the Z axis direction at regular intervals all the way around the focus ring 67, when these protrusions pass between a light emitting unit and a light receiving unit, which are constituent portions of two photosensors (not shown). The second rotation detector 68 detects the rotational angle and rotation direction made to the focus ring 67 by the user, and sends the rotational angle and rotation direction to the lens microcomputer 40 as object distance information.

The lens mount 71 has a lens mount contact (not shown), and transmits signals between the lens microcomputer 40 and the body microcomputer 10 via the lens mount contact (not shown) of the body mount 4. The lens mount 71 is fixed to the fixed frame 50 via the mount base 70.

A focus lens unit 78 is provided that can move in a direction along the optical axis AZ as the focussing proceeds, and has the second lens group L2, the second lens support frame 58, the second holder 61, guide poles 74a and 74b, a third holder 75, the ultrasonic actuator unit 80, a magnetic scale 76, and a magnetic sensor 77.

The second lens support frame 58 supports the second lens group L2 (focus lens group), and is fixed to the third holder 75 and the second holder 61. The guide pole 74b extends in the Z axis direction from a fixing portion 58b of the second lens support frame 58, and is inserted into a hole 75a in the third holder 75. The second lens support frame 58 is supported movably in the Z axis direction by the third holder 75. The second lens support frame 58 is driven in the Z axis direction by the ultrasonic actuator unit 80.

The ultrasonic actuator unit 80 has a movable part 80a and a fixed part 80b. The movable part 80a is fixed with screws or the like to the fixing portion 58b of the second lens support frame 58. When a specific current is sent to the ultrasonic actuator unit 80, the movable part 80a moves in the Z axis direction with respect to the fixed part 80b, and the second lens support frame 58 is driven in the Z axis direction as a result.

The magnetic scale 76 and magnetic sensor 77 constitute a position detecting unit that detects the position of the second lens support frame 58 with respect to the third holder 75. The magnetic scale 76 is fixed to the second lens support frame 58 and is magnetized at regular intervals in the Z axis direction. The magnetic sensor 77 is an MR sensor or the like that detects signals from the magnetic scale 76, and is fixed to the third holder 75. A specific spacing is maintained between the magnetic sensor 77 and the magnetic scale 76. Performing position detection and feedback control with the magnetic sensor 77 affords a linear actuator that has high-speed response as well as high resolution, high accuracy, quiet operation, and high torque. Consequently, the digital camera 1 will have excellent focus characteristics.

Furthermore, the position of the second lens group L2 with respect to the second holder 61, that is, the home position of the second lens support frame 58, can be detected with a photosensor or the like (not shown). Also, as to the relative position from the home position, if the output value from the magnetic sensor 77 is counted, where the second lens group L2 is located can always be detected.

Figure 7:
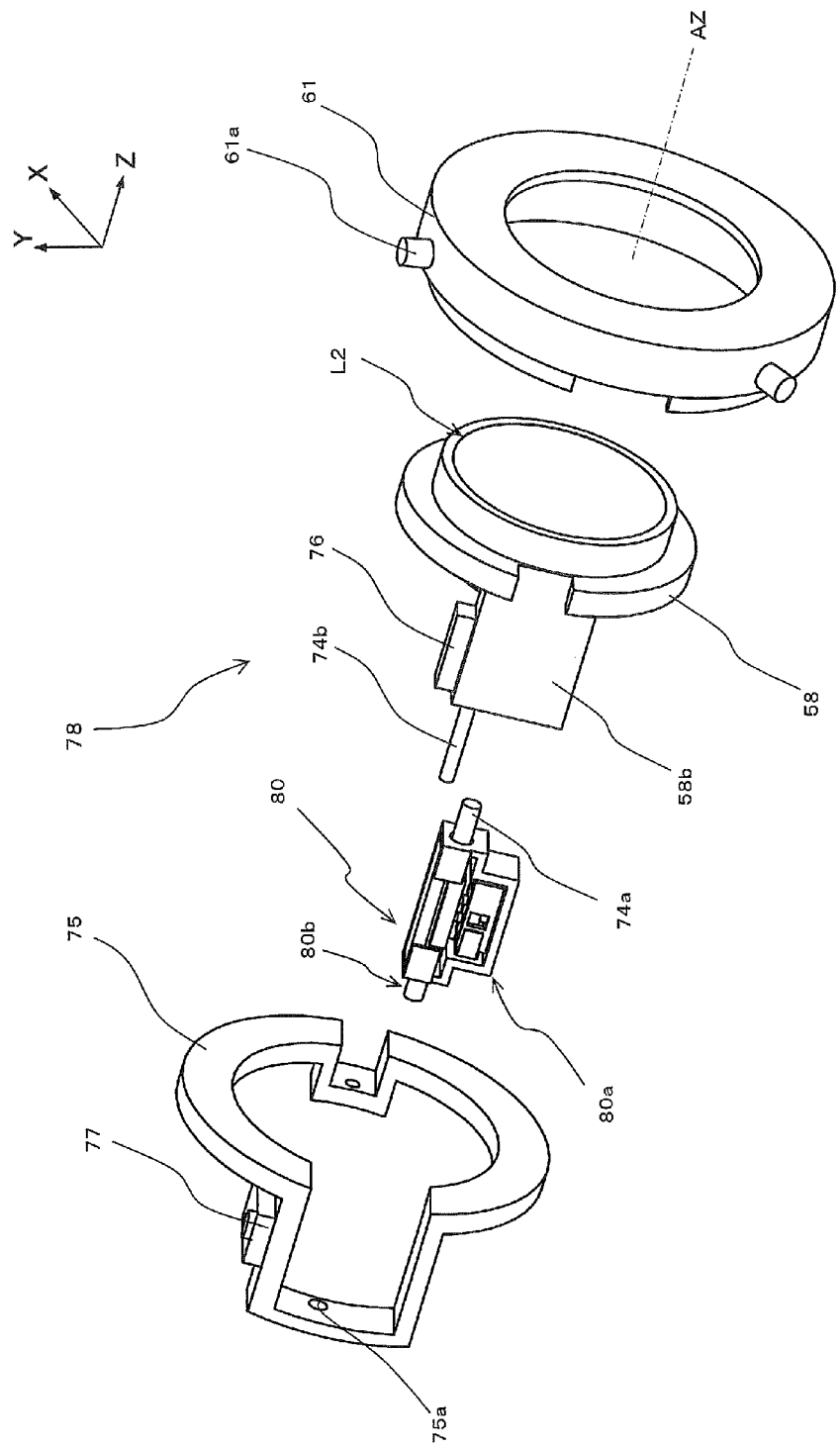
FIG. 7 is an exploded oblique view of a focus lens unit.
Figure 8:
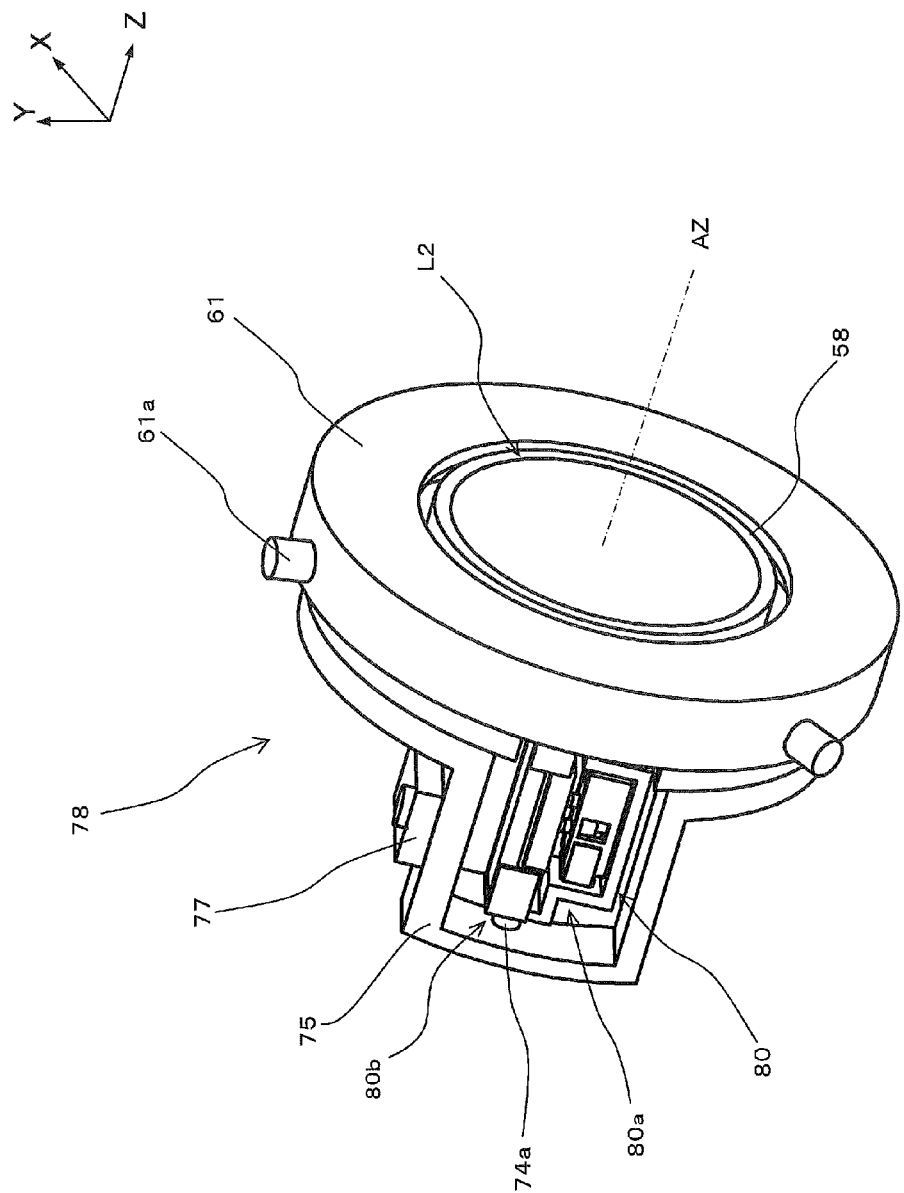
FIG. 8 is an oblique view of a focus lens unit.

Next, the ultrasonic actuator unit 80 will be described through reference to FIGS. 7 and 10.

Figure 9:
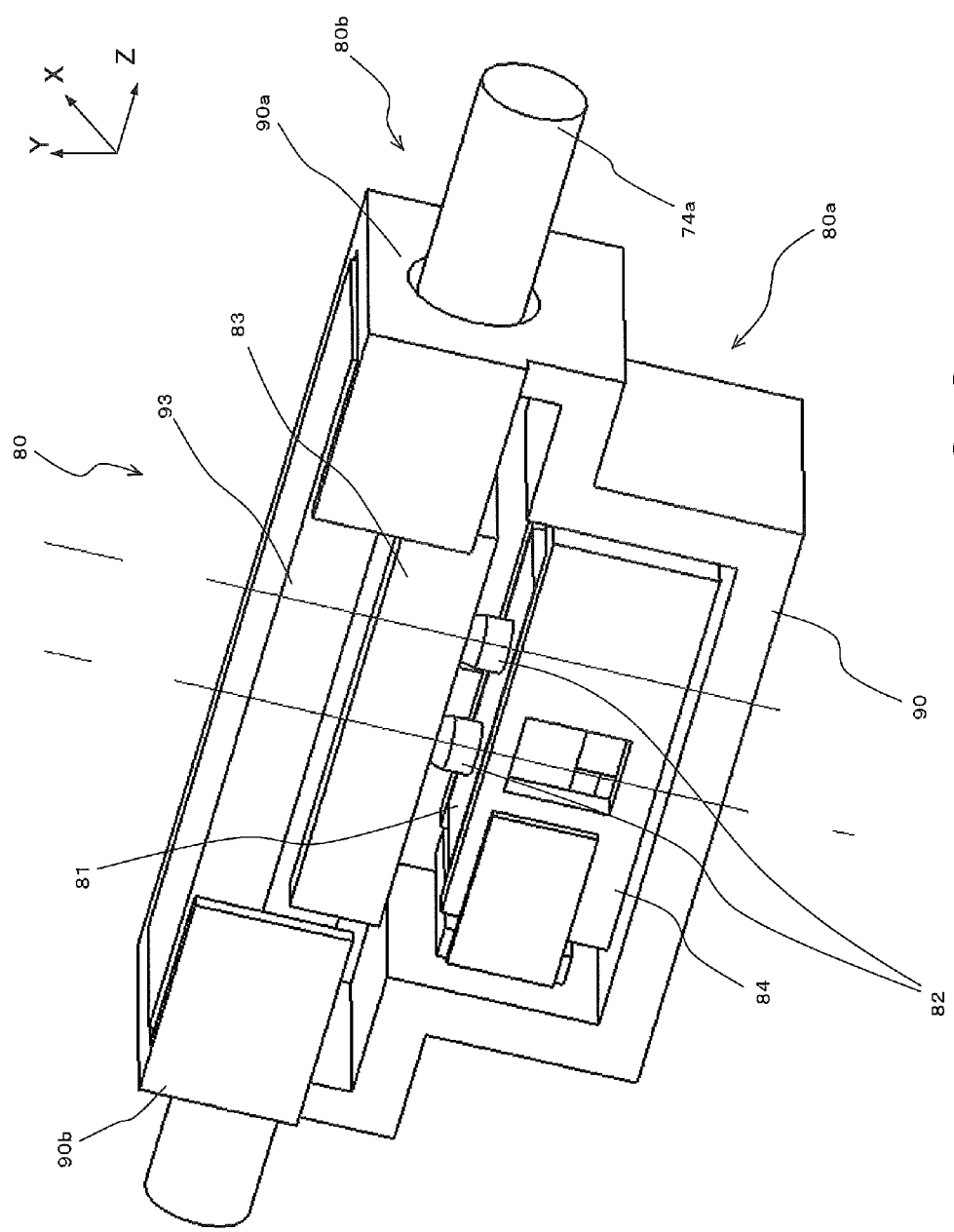
FIG. 9 is an oblique view of an ultrasonic actuator unit.
Figure 10:
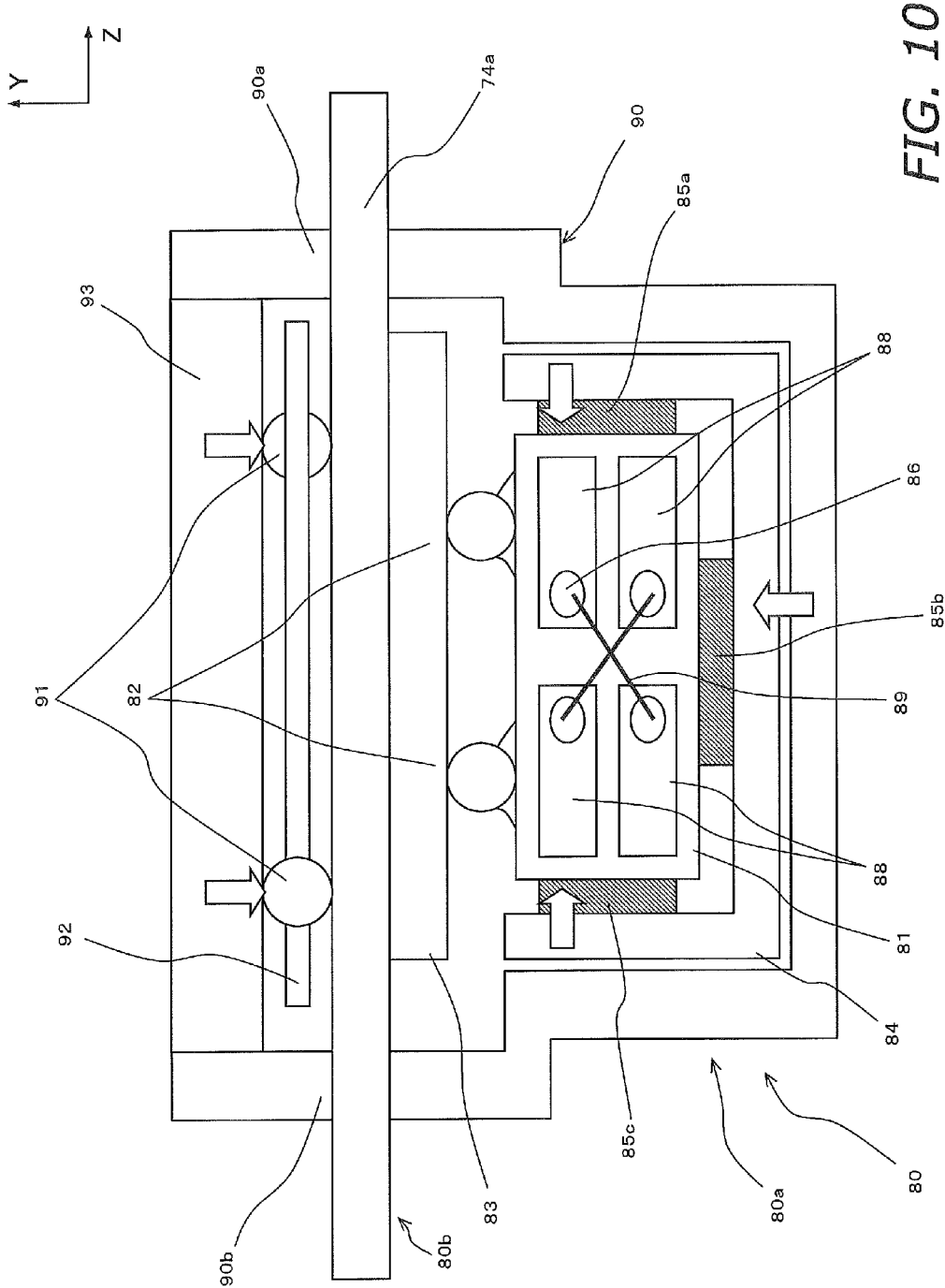
FIG. 10 is a plan view of an ultrasonic actuator unit.

As shown in FIGS. 9 and 10, in the ultrasonic actuator unit 80, substantially spherical drivers 82 are provided at two places on the surface of a piezoelectric element 81 composed of PZT, quartz crystal, or another such piezoelectric material. These two places correspond to the approximate center of the antinode of flexural vibration of the piezoelectric element 81, and the vibration of the piezoelectric element 81 can be more effectively utilized by providing the drivers 82 at these locations.

Examples of the material of the drivers 82 include zirconia, alumina, silicon nitride, silicon carbide, and tungsten carbide. The shape of the drivers 82 is substantially spherical, and using a substantially spherical shape reduces the contact surface area of the piezoelectric element 81 in the lengthwise direction. Consequently, there is less impairment of the flexural vibration of the piezoelectric element 81, and as a result its efficiency as an ultrasonic actuator can be improved.

A power supply electrode 88 that is divided in four is provided to the front face of the piezoelectric element 81, and these power supply electrodes 88 are connected to wires 89 by solder 86. The wires 89 are guided to the outside through holes (not shown) provided to an inner case 84. When voltage is supplied through these wires 89 to the power supply electrodes 88 of the piezoelectric element 81, the piezoelectric element 81 vibrates according to the frequency of the applied voltage. The portion of the piezoelectric element 81 where the solder 86 is formed is the node periphery of stretching vibration and flexural vibration. If this node is used as the site where the wires 89 are connected, this will reduce the adverse effect on the vibration of the piezoelectric element 81, that is, the unnecessary load on the piezoelectric element 81 caused by forming the solder 86.

The ultrasonic actuator unit 80 mainly has the movable part 80a and the fixed part 80b. The movable part 80a has the piezoelectric element 81, the drivers 82, the inner case 84, an outer case 90, guide balls 91, a retainer 92, and an outer case cover 93. The fixed part 80b has a moving body 83, a slide plate 94, and the guide pole 74a.

The drivers 82 support the moving body 83, and the drivers 82 undergo substantially elliptical motion under the vibration of the piezoelectric element 81, which causes the drivers 82 to move reciprocally in the Z axis direction with respect to the moving body 83. Specifically, the stretching vibration direction of the piezoelectric element 81 is the same as the direction in which the moving body 83 is able to move. Also, the flexural vibration direction is perpendicular to the movable direction with respect to the moving body 83, and is a direction that links the piezoelectric element 81 and the moving body 83 (that is, the direction in which the drivers 82 support the moving body 83).

Alumina is an example of the material of the moving body 83. If alumina is used for the drivers 82, then from the standpoint of wear, the alumina of the moving body 83 is preferably softer than the alumina of the drivers 82.

The piezoelectric element 81 is housed in the inner case 84, and the piezoelectric element 81 is supported by a support 85 provided inside the inner case 84. The support 85 is made from electroconductive silicone rubber, for example. Specifically, the piezoelectric element 81 is disposed in the inner case 84 so that the stretching direction of the piezoelectric element 81 is the same as the direction in which the moving body 83 is able to move (the Z axis direction, a direction along the optical axis AZ). Side wall supports 85a and 85c are provided to the inner side walls of the inner case 84 in the same direction as the direction in which the moving body 83 is able to move, and side pressure is exerted on the inner side walls. A rear face support 85b is provided to the inner bottom face of the inner case 84, which supports the piezoelectric element 81 and thereby exerts a pressing force. The rear face support 85b is provided so that the two drivers 82 here support the moving body 83 at substantially the same pressure, and this allows the moving body 83 to be operated stably.

The inner case 84 is fixed inside the outer case 90. The guide pole 74a, which is cylindrical in shape, is disposed at the upper part of the moving body 83. The guide balls 91 are provided at two places supported by the retainer 92 on the guide pole 74a. The outer case cover 93 is provided at the upper part of the guide balls 91. The guide balls 91 are sandwiched between the outer case cover 93 and the guide pole 74a. Accordingly, a pressing force is exerted on the guide pole 74a via the guide balls 91. Consequently, the guide pole 74a and the moving body 83 are pressed together and fixed at a specific pressure.

Bearings 90a and 90b that support the guide pole 74a are provided to the ends of the outer case 90, and the outer case 90 is able to move in the Z axis direction with respect to the guide pole 74a. That is, when the drivers 82 move elliptically, this allows the movable part 80a to move reciprocally in a direction along the optical axis AZ with respect to the fixed part 80b comprising the guide pole 74a and the moving body 83.

The operation of the ultrasonic actuator unit 80 constituted as above will now be described. When AC voltage of a specific frequency is applied to a specific power electrode of the piezoelectric element 81, a secondary mode of flexural vibration and a primary mode of stretching vibration are induced in the piezoelectric element 81. The resonance frequency of the flexural vibration and the resonance frequency of the stretching vibration are determined by the material, shape, and so forth of the piezoelectric element, and if these two frequencies are substantially matched, and voltage with a frequency that is close to these is applied, a flexural secondary mode and a stretching primary mode will be harmonically induced in the piezoelectric element 81. As a result, the drivers 82 provided to the piezoelectric element 81 undergo elliptical motion as viewed in the direction of the drawing plane. Specifically, the combination of the flexural vibration and stretching vibration of the piezoelectric element 81 brings about elliptical motion in the drivers 82. Because of this elliptical motion, the movable part 80*a* constituted by the drivers 82, etc., can move reciprocally in the Z axis direction with respect to the moving body 83, and moves integrally with the second lens group L2.

1.2: Camera Body

Figure 2:
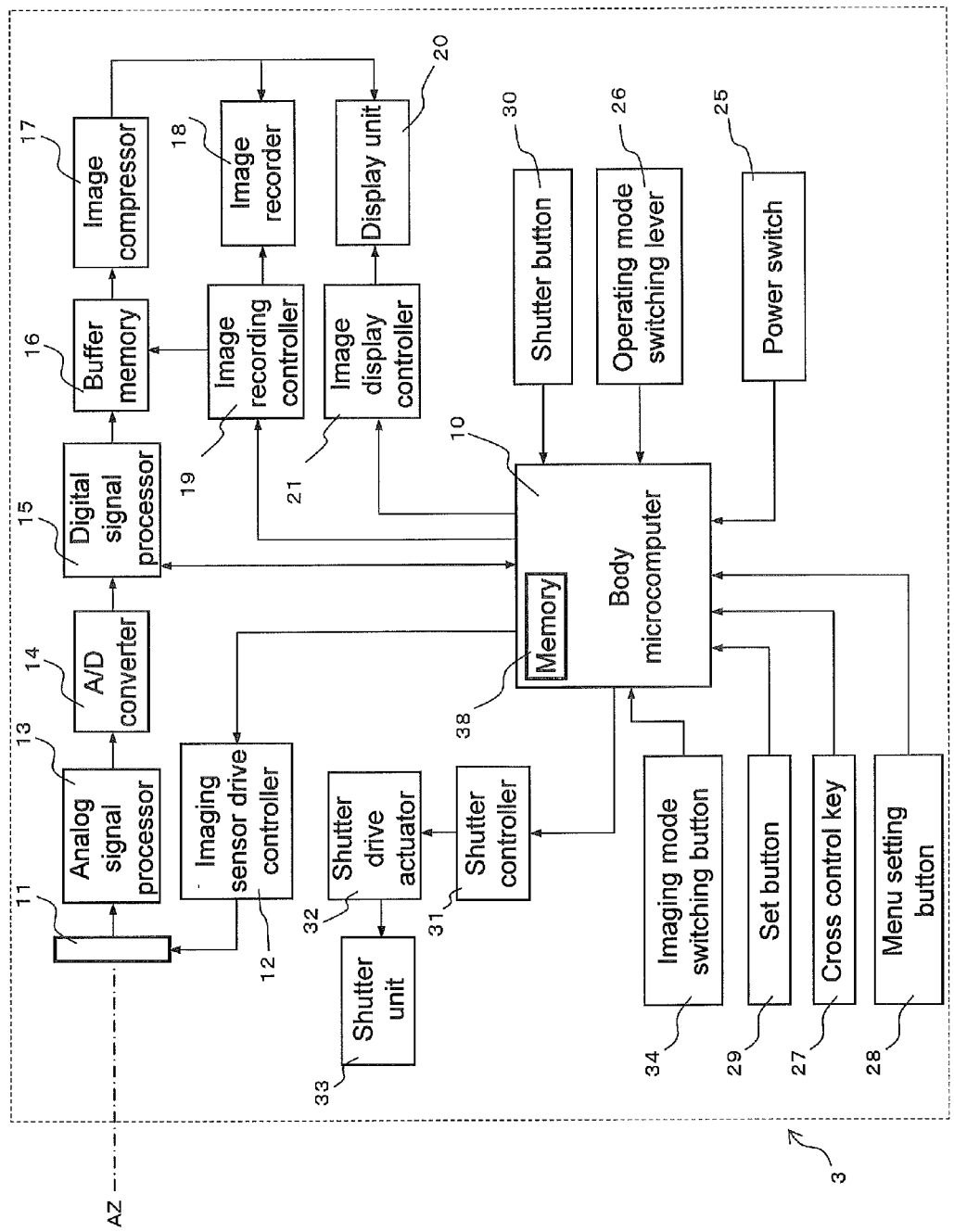
FIG. 2 is a simplified diagram of a camera body.

As shown in FIGS. 1 and 2, the camera body 3 mainly comprises an imaging unit 35 that captures an image of a subject, a body microcomputer 10 serving as a body controller that controls the various operations of the imaging unit 35 and so forth, an image display unit 36 that displays various information and captured images, an image storage unit 37 that stores image data, and a viewfinder 39 through which a subject image is viewed.

The imaging unit 35 mainly comprises an imaging sensor 11 such as a CCD (charge coupled device) that performs opto-electric conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 11. The focusing method in this embodiment is a contrast type of autofocusing based on the image data produced by the imaging sensor 11. Using a contrast method affords focusing with good accuracy.

The imaging sensor 11 is, for example, a CCD (charge coupled device) sensor that converts an optical image formed by the optical system L into an electrical signal. The drive of the imaging sensor 11 is controlled by a timing signal generated by the imaging sensor drive controller 12. The imaging sensor 11 may also be a CMOS (complementary metal-oxide semiconductor) sensor.

The body microcomputer 10 is the main control apparatus for the camera body 3, and controls various sequences. More specifically, a CPU, ROM, and RAM are installed in the body microcomputer 10, and the CPU reads the programs loaded in the ROM, which allows the body microcomputer 10 to carry out its various functions. For example, the body microcomputer 10 has the function of detecting that the interchangeable lens unit 2 has been mounted to the camera body 3, or the function of acquiring lens information stored in the memory 44 from the interchangeable lens unit 2. As discussed above, this lens information includes operation direction information, focal length information, and object distance information. The body microcomputer 10 also has the function of adjusting the display state of a zoom display bar 105 on the basis of lens information. This function will be discussed below.

The body microcomputer 10 is also able to receive signals from a power switch 25, a shutter button 30, an operating mode switching lever 26, a cross control key 27, a menu setting button 28, and a set button 29. Various information related to the camera body 3 is stored in a memory 38 in the body microcomputer 10. The body microcomputer 10 serves as a controller for controlling a display unit 20 along with an image display controller 21.

The body microcomputer 10 controls the entire digital camera 1, including the imaging sensor 11 and so forth, according to the commands from control members such as the shutter button 30. The body microcomputer 10 sends a vertical synchronization signal to a timing generator. Parallel with this, the body microcomputer 10 produces an exposure synchronization signal on the basis of the vertical synchronization signal. The body microcomputer 10 sends the exposure synchronization signal thus produced at a specific period to the lens microcomputer 40 through the body mount 4 and the lens mount 71.

The body mount 4 can be mechanically and electrically connected to the lens mount 71 of the interchangeable lens unit 2. The body mount 4 is able to exchange information with the interchangeable lens unit 2 via the lens mount 71. For example, the body mount 4 sends the exposure synchronization signal received from the body microcomputer 10 to the lens microcomputer 40 via the lens mount 71. Other control signals received from the body microcomputer 10 are also sent to the lens microcomputer 40 via the lens mount 71. The body mount 4 also sends the body microcomputer 10 signals received from the lens microcomputer 40 via the lens mount 71. Also, the body mount 4 supplies the power supplied from a power supply unit (not shown) to the entire interchangeable lens unit 2 through the lens mount 71.

Figure 4A:
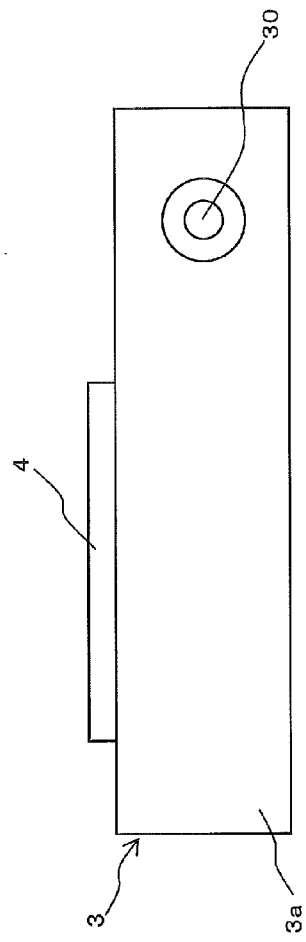
FIG. 4A is a top view of the camera body.

In FIG. 4, the case 3a of the camera body 3 is supported by the user during photography of a subject. The rear face of the case 3a is provided with the display unit 20, the power switch 25, the operating mode switching lever 26, the cross control key 27, the menu setting button 28, and the set button 29.

The power switch 25 is used to switch on and off the power to the digital camera 1 or the camera body 3. When the power is switched on with the power switch 25, power is supplied to the various components of the camera body 3 and the interchangeable lens unit 2. The operating mode switching lever 26 is used to switch between imaging mode and reproduction mode. The user can turn the operating mode switching lever 26 to switch the operating mode. The menu setting button 28 is used to set the various operations of the digital camera 1. The cross control key 27 is a control member with which the user presses the top, bottom, left, or right part of the key to select the desired menu from the various menu screens displayed on the display unit 20. The set button 29 is used to execute the various menus.

Figure 4B:
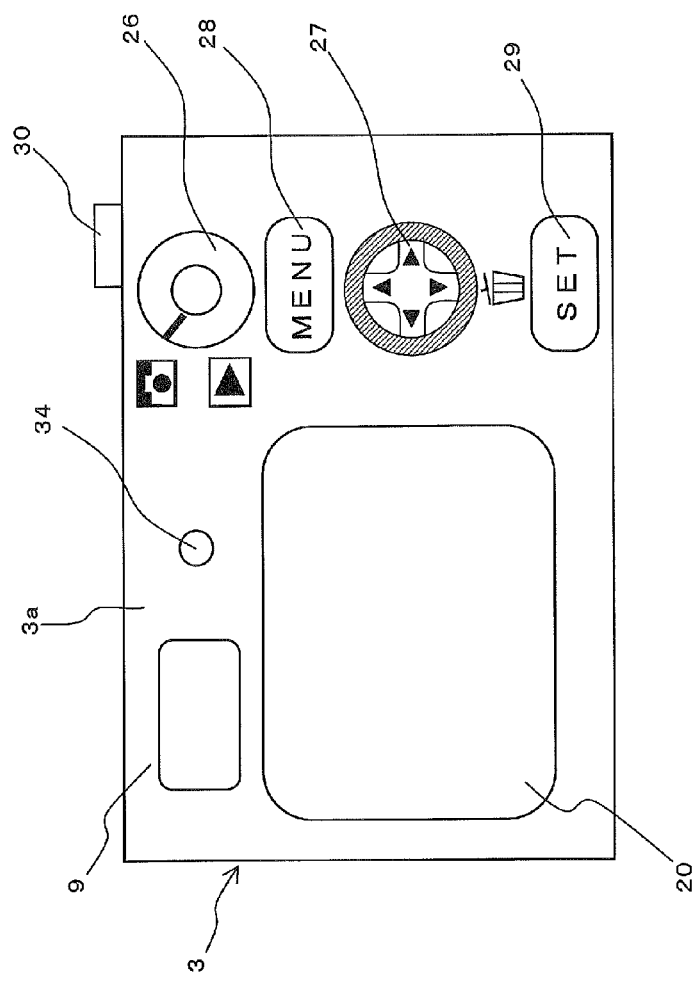
FIG. 4B is a rear view of the camera body.

As shown in FIG. 4B, the shutter button 30 is provided to the top face of the case 3*a*. When the shutter button 30 is pressed, a timing signal is outputted to the body microcomputer 10. The shutter button 30 is a two-position switch that can be pressed halfway or all the way down. When the user presses the shutter button 30 halfway down, processing for light metering and ranging begins. When the shutter button 30 is then pressed all the way down, a timing signal is outputted. The shutter controller 31 drives a shutter drive actuator 32 and operates the shutter unit 33 according to the control signal outputted from the body microcomputer 10 upon receipt of the timing signal.

As shown in FIG. 2, the image signal outputted from the imaging sensor 11 is sent to and processed by an analog signal processor 13, an A/D converter 14, a digital signal processor 15, a buffer memory 16, and an image compressor 17, in that order. The analog signal processor 13 subjects the image signal outputted by the imaging sensor 11 to analog signal processing, such as gamma processing. The A/D converter 14 converts the analog signal outputted from the analog signal processor 13 into a digital signal. The digital signal processor 15 subjects the image signal converted into a digital signal by the A/D converter 14 to digital signal processing, such as noise elimination or contour enhancement. The buffer memory 16 is a RAM (random access memory), which temporarily stores image signals. The image signal stored in the buffer memory 16 is sent to and processed by the image compressor 17 and an image recorder 18, in that order. The image signal stored in the buffer memory 16 is read at a command from an image recording controller 19, and sent to the image compressor 17. Data for the image signal sent to the image compressor 17 is compressed into an image signal according to a command from the image recording controller 19. The image signal is compressed to a data size that is smaller than that of the original data. The compression method can be, for example, JPEG (Joint Photographic Experts Group). Also, an H.264/AVC format in which a plurality of frames of image signals are compressed together can be used. The compressed image signal is recorded to the image recorder 18 by the image recording controller 19.

The image recorder 18 is an internal memory and/or a removable memory, for example, that records while referencing specific information to be recorded with the image signal on the basis of a command from the image recording controller 19. The specific information to be recorded along with the image signal includes the date and time the image was captured, focal length information, shutter speed information, aperture value information, and imaging mode information. The format for this information includes the Exif (registered trademark) format and formats similar to the Exif (registered trademark) format. A moving picture file is, for example, in H.264/AVC format or a format similar to an H.264/AVC format.

The display unit 20 is a liquid crystal monitor, for example, and displays as a visible image the image signal recorded to an image recorder 18 or a buffer memory 16 based on a command from the image display controller 21. The display modes of the display unit 20 are a display mode in which just the image signal is displayed as a visible image, and a display mode in which the image signal and information from the time of capture are displayed as a visible image.

2: Operation of Digital Camera

The imaging operation of the digital camera 1 will now be described through reference to FIGS. 1 to 6.

2.1: Imaging Mode

This digital camera 1 has two imaging modes. The first is a viewfinder imaging mode in which the user captures a picture while looking through a viewfinder eyepiece window 9. In the viewfinder imaging mode, the image display controller 21 drives a liquid crystal viewfinder 8, for example. The second is a monitor imaging mode (the so-called live view mode) in which an image of the subject (a so-called through image) is displayed acquired via the imaging sensor 11. Switching between these two imaging modes can be performed with an imaging mode switching button 34.

2.2: Operation in Monitor Imaging Mode

The operation in monitor imaging mode will now be described.

Contrast autofocusing is favorable in monitor imaging mode using the display unit 20 (through image mode). This is because in live view mode, image data is constantly produced by the imaging sensor 11, and contrast autofocusing this image data is easy. When contrast autofocusing is performed, the body microcomputer 10 asks the lens microcomputer 40 for contrast AF data. This contrast AF data is necessary in contrast autofocusing, and includes, for example, the focus drive speed, the amount of focus shift, the zoom ratio, and whether or not contrast autofocus is possible.

The body microcomputer 10 periodically produces a vertical synchronization signal. The body microcomputer 10 produces an exposure synchronization signal in parallel with this on the basis of the vertical synchronization signal. This allows an exposure synchronization signal to be produced because the body microcomputer 10 ascertains ahead of time the exposure start and end timing, using the vertical synchronization signal as a reference. The body microcomputer 10 outputs the vertical synchronization signal to a timing generator (not shown), and outputs the exposure synchronization signal to the lens microcomputer 40. The lens microcomputer 40 synchronizes with the exposure synchronization signal and acquires position information about the second lens group L2.

The imaging sensor drive controller 12 periodically produces an electronic shutter drive signal and the read signal of the imaging sensor 11 on the basis of the vertical synchronization signal. The imaging sensor drive controller 12 drives the imaging sensor 11 on the basis of the electronic shutter drive signal and the read signal. Specifically, the imaging sensor 11 reads to a vertical transmitter (not shown) the image data produced by numerous opto-electrical conversion elements (not shown) present in the imaging sensor 11, according to the read signal.

In the state described above, the body microcomputer 10 monitors whether or not the shutter button 30 has been pressed halfway down. When the shutter button 30 is pressed halfway down, the body microcomputer 10 sends an autofocus start command to the lens microcomputer 40. This autofocus start command tells the lens microcomputer 40 to start contrast autofocusing. Upon receiving this command, the lens microcomputer 40 controls the drive of the ultrasonic actuator unit 80, which is a focusing actuator. The body microcomputer 10 calculates an evaluation value used for autofocusing (hereinafter referred to as an AF evaluation value) on the basis of the received image data. More specifically, there is a known method in which a brightness signal is found from the image data produced by the imaging sensor 11, the high-frequency component of the brightness signal on the screen is added up, and the AF evaluation value is found. The calculated AF evaluation value is stored in a DRAM (not shown) in a state of being associated with the exposure synchronization signal. The lens position information acquired from the lens microcomputer 40 is also associated with the exposure synchronization signal. Accordingly, the body microcomputer 10 can store the AF evaluation value in association with lens position information.

Next, the body microcomputer 10 finds the contrast peak on the basis of the AF evaluation value stored in the DRAM, and monitors whether or not the focus point has been selected. More specifically, the position of the second lens group L2 at which the AF evaluation value is at its maximum value is selected as the focus point. This lens drive method is commonly known as the mountain climbing method.

In this state, the digital camera 1 can operate in a control mode in which an image showing the image data produced by the imaging sensor 11 is displayed as a through image on the display unit 20. This control mode is called the live view mode. In live view mode, the through image is displayed as a moving picture on the display unit 20, so the user can determine the composition for capturing a still picture or moving picture while looking at the display unit 20. In addition to live view mode using the display unit 20, control modes that the user can select include viewfinder imaging mode (also called the second live view mode) in which a subject image from the interchangeable lens unit 2 is guided to a liquid crystal viewfinder (the viewfinder 39).

2.3: Operation During Imaging

After this, when the user presses the shutter button 30 all the way down, a command is sent from the body microcomputer 10 to the lens microcomputer 40 so that the aperture value be set to the one calculated on the basis of the output from the light metering sensor (not shown). The lens microcomputer 40 then controls the aperture drive controller 42 and stops down the aperture until the indicated aperture value is reached. Simultaneously with the aperture value indication, the imaging sensor drive controller 12 outputs a command to drive the imaging sensor 11, and directs that the shutter unit 33 be operated. The imaging sensor drive controller 12 also exposes the imaging sensor 11 for the length of time of the shutter speed calculated on the basis of the output from the imaging sensor 11.

Upon completion of the exposure, the image data read from the imaging sensor 11 by the imaging sensor drive controller 12 is subjected to specific image processing, after which image data is outputted through the body microcomputer 10 to the image display controller 21. Consequently, a captured image is displayed on the display unit 20. Also, the image data is held in a storage medium via the image recording controller 19. Also, upon completion of exposure, the shutter unit 33 is reset to its initial position by the body microcomputer 10. Also, a command is issued from the body microcomputer 10 to the aperture drive controller 42 of the lens microcomputer 40 so that the aperture will be reset to its open position, and reset commands are issued by the lens microcomputer 40 to the various units. Upon completion of the resetting, the lens microcomputer 40 notifies the body microcomputer 10 of resetting completion. The body microcomputer 10 awaits the series of processing after exposure and the completion of resetting from the lens microcomputer 40, after which it is confirmed that the shutter button 30 has not been pressed, and the imaging sequence is ended.

2.4: Zooming Operation

The operation of the interchangeable lens unit 2 when the user performs zooming will now be described.

When the user turns the zoom ring 64, the turning motion of the zoom ring 64 is transmitted to the first rotary frame 53 linked to the zoom ring 64. As a result, the first rotary frame 53 rotates around the optical axis AZ with respect to the fixing frame 50. Here, since the first rotary frame 53 is guided by the cam through-grooves 50b of the fixing frame 50, the first rotary frame 53 moves in the Z axis direction while rotating around the optical axis AZ with respect to the fixing frame 50. The first linear frame 52 moves linearly in the Z axis direction with respect to the fixing frame 50, integrally with the first rotary frame 53.

When the first rotary frame 53 rotates around the optical axis AZ with respect to the fixing frame 50, the cam pins 54a are guided by the cam through-grooves 53a. As a result, the first holder 54 and the first lens support frame 57 fixed to the first holder 54 move linearly in the Z axis direction with respect to the fixing frame 50. Furthermore, when the first rotary frame 53 rotates around the optical axis AZ with respect to the fixing frame 50, the cam pins 61a are guided by the cam through-grooves 53b, so the second holder 61 and the second lens support frame 58 move integrally and linearly in the Z axis direction with respect to the fixing frame 50. That is, the focus lens unit 78 moves in the Z axis direction with respect to the fixing frame 50.

Also, when the first rotary frame 53 rotates around the optical axis AZ, the cam pins 55a are guided by the cam through-grooves 50b. As a result, the second rotary frame 55 moves in the Z axis direction while rotating around the optical axis AZ with respect to the fixing frame 50.

When the second rotary frame 55 rotates around the optical axis AZ with respect to the fixing frame 50, the cam pins 59a are guided by the linear through-grooves 50a. Accordingly, the third lens support frame 59 moves in the Z axis direction with respect to the fixing frame 50. Also, when the second rotary frame 55 rotates around the optical axis AZ, the cam pins 60a are guided by cam through-grooves 55b, and the fourth lens support frame 60 moves in the Z axis direction with respect to the fixing frame 50.

Thus, by turning the zoom ring 64, it is possible to move the various lens groups (the first to fourth lens groups L1 to L4) in the Z axis direction, from the wide angle end state shown in FIG. 5 to the telephoto end state shown in FIG. 6, and capture an image at a specific zoom position.

Here, the focus lens unit 78 moves in the Z axis direction with respect to the second holder 61 as the zoom ring 64 rotates, so that the object distance is kept substantially constant regardless of a change in the focal length. Further, during autofocusing, contrast detection is performed on the basis of the output of the imaging sensor 11, and the second lens group L2 is driven with respect to the second holder 61 by the ultrasonic actuator unit 80. As a result, the focus state is maintained at infinity even if the zoom ring 64 is operated from the wide angle end to the telephoto end, or from the telephoto end to the wide angle end, in a state of being focused at infinity. In other words, when the zoom ring 64 is turned, the focus lens unit 78 mechanically moves in the Z axis direction along with the movement of the first rotary frame 53 and first linear frame 52, and only the second lens group L2 is electrically driven by the ultrasonic actuator unit 80 with respect to the focus lens unit 78 so that the optimal focus state will be obtained. The drive of the ultrasonic actuator unit 80 is electronically controlled on the basis of tracking information stored ahead of time in the memory 44 of the interchangeable lens unit 2. Similarly, in a state of focus at a short distance of 1 m, for example, whether the movement is from the wide angle end to the telephoto end, or from the telephoto end to the wide angle end, the focus state will be maintained at a short distance by drive of the ultrasonic actuator unit 80, so the zooming operation can be carried out smoothly.

2.5: Focusing Operation

The focusing operation of the digital camera 1 will now be described. The digital camera 1 has two focus modes: an autofocus mode and a manual focus mode. A specific imaging mode is set by using a focus mode setting button provided to the camera body 3.

In autofocus mode, when the shutter button 30 is pressed halfway down, the lens microcomputer 40 sends a control signal to the focus lens drive controller 41, which drives the ultrasonic actuator unit 80 and nudges the second lens group L2 to perform autofocusing. The body microcomputer 10 sends a command to the digital signal processor 15. The digital signal processor 15 sends an image signal to the body microcomputer 10 at a specific timing on the basis of the received command. The body microcomputer 10 calculates the amount of movement of the second lens group L2 in the Z axis direction at which the optical system L will be in focus on the basis of the received image signal and focal length information received from the zoom ring unit 63. The body microcomputer 10 produces a control signal on the basis of the calculated result. The body microcomputer 10 sends a control signal to the focus lens drive controller 41.

The focus lens drive controller 41 produces a drive signal for driving the ultrasonic actuator unit 80 on the basis of the control signal from the body microcomputer 10. The ultrasonic actuator unit 80 is driven on the basis of a drive signal.

This drive of the ultrasonic actuator unit 80 causes the second lens group L2 to move automatically in the Z axis direction.

Focusing is performed in the autofocus mode of the digital camera 1 as discussed above. The above operation is executed instantly after the shutter button 30 is pressed halfway down. When the user presses the shutter button 30 all the way down, the body microcomputer 10 execute imaging processing, and when the imaging is complete, a control signal is sent to the image recording controller 19 from the body microcomputer 10. The image recorder 18 records the image signal to an internal memory and/or removable memory on the basis of a command from the image recording controller 19. The image recorder 18 records information to the effect that the imaging mode is the autofocus photography mode, along with the image signal, to an internal memory and/or removable memory on the basis of a command from the image recording controller 19.

In manual focus mode, the lens microcomputer 40 asks the focus lens drive controller 41 for information about the rotational angle of the focus ring 67. When the user turns the focus ring 67, the rotational angle of the focus ring 67 is detected by the second rotation detector 68, and a signal corresponding to the detected rotational angle is outputted by the second rotation detector 68 to the lens microcomputer 40. The lens microcomputer 40 produces a drive signal for driving the ultrasonic actuator unit 80 on the basis of the rotational angle signal outputted from the second rotation detector 68. The lens microcomputer 40 sends the produced drive signal to the focus lens drive controller 41. This drive signal causes the ultrasonic actuator unit 80 to move in the Z axis direction with respect to the second holder 61, and this is accompanied by movement in the Z axis direction of the second lens support frame 58 to which the ultrasonic actuator unit 80 is fixed. Thus, the second lens group L2 is driven with respect to the second holder 61 according to the rotation direction and the rotational angle of the focus ring 67.

In the wide angle end state shown in FIG. 5, the second lens group L2 is disposed at a position where the distance to the in-focus subject (the object distance) is infinity, but as the object distance is shortened, the second lens group L2 moves to the Z axis direction positive side. Similarly, in the telephoto end state shown in FIG. 6, the second lens group L2 is disposed at a position where the object distance is infinity, but as the distance to the subject is shortened, the second lens group L2 moves to the Z axis direction positive side. In the telephoto end state shown in FIG. 6, the amount of movement of the second lens group L2 is greater than in the case of the wide angle end shown in FIG. 5.

Focusing is performed in the manual focus mode of the digital camera 1 as discussed above. In manual focus mode, when the user presses the shutter button 30 all the way down, imaging is performed with the focus state left unchanged.

When imaging is complete, the body microcomputer 10 sends a control signal to the image recording controller 19. The image recorder 18 records the image signal to an internal memory and/or removable memory on the basis of a command from the image recording controller 19. The image recorder 18 records information to the effect that the imaging mode is the manual focus mode, along with the image signal, to an internal memory and/or removable memory on the basis of a command from the image recording controller 19.

2.6: Focal Length Display

In monitor imaging mode, a zoom display bar 105 (an example of a state indicator) that shows the focal length (an example of the state of the optical system L) is displayed on the display unit 20. The display state of the zoom display bar 105 is determined by the body microcomputer 10 so that the operation direction of the zoom ring 64 will substantially coincide with the direction in which the state of the zoom display bar 105 changes.

Figure 11:
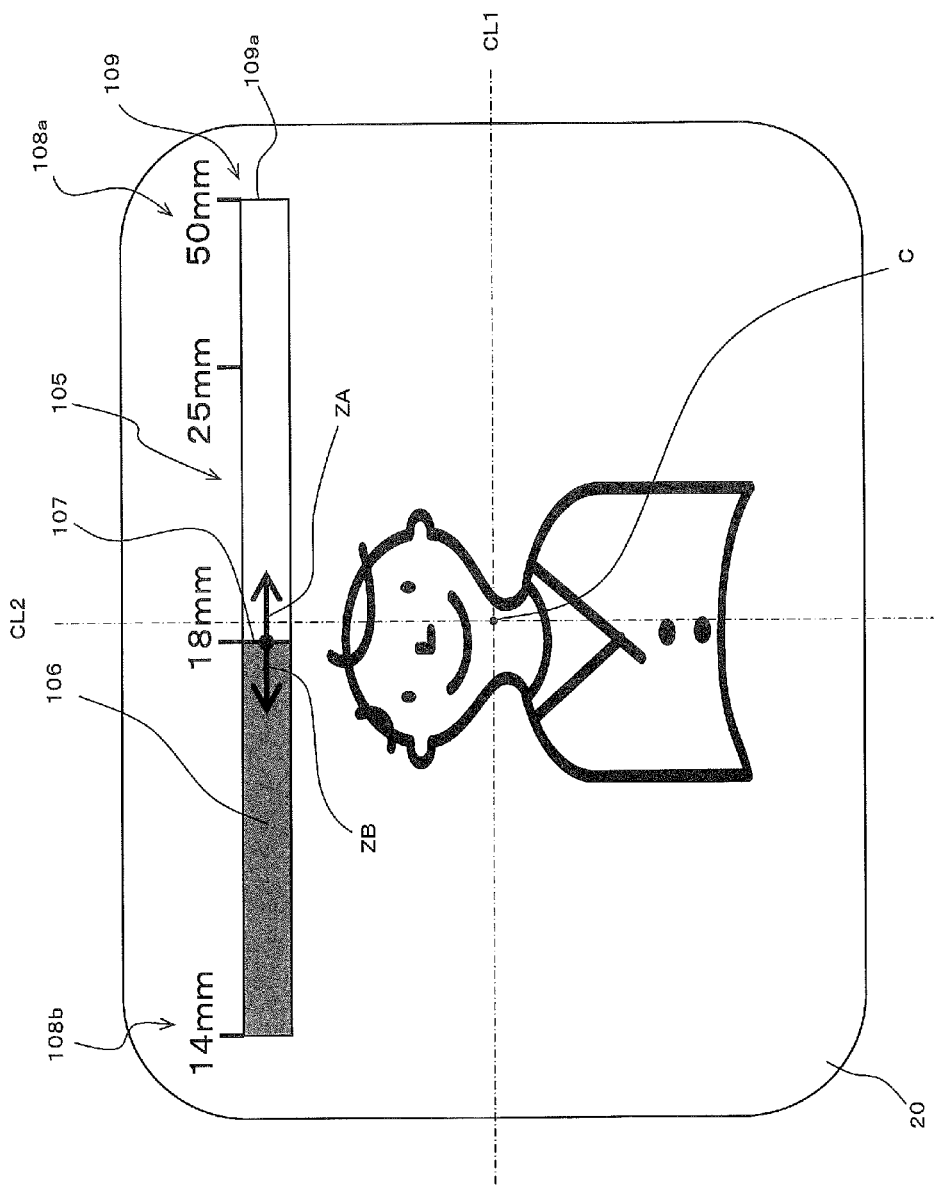
FIG. 11 is an example of a zoom display.

The constitution of the zoom display bar 105 will now be described. FIG. 11 shows an example of the zoom display bar 105. The image display controller 21 controls the display unit 20 so that the zoom display bar 105 is displayed on the display unit 20.

As shown in FIG. 11, the zoom display bar 105 is disposed in the upper half of the display unit 20 area. More specifically, the two lines that are perpendicular to each other and pass through the center C of the display unit 20 shall be termed a first line CL1 and a second line CL2. In the so-called landscape orientation (when an image is captured with the digital camera 1 in the orientation shown in FIG. 3), the first line CL1 is parallel to the horizontal direction, and the second line CL2 is parallel to the vertical direction. In the state shown in FIG. 11, the zoom display bar 105 is disposed above the first line CL1. More precisely, the zoom display bar 105 is disposed in the upper part of the display area of the display unit 20.

As shown in FIG. 11, the zoom display bar 105 is proportional to the focal length (the positions of the first to fourth lens groups L1 to L4 in the Z axis direction), and has a display meter 109 that shows focal length information, and a zoom pointer 107 that shows the current value of the focal length of the optical system L. The display meter 109 has a substantially rectangular meter box 109a that extends to the left and right. The focal length is displayed above the meter box 109a. For example, the maximum value 108a for focal length is displayed at the right end of the meter box 109a, and the minimum value 108b for focal length is displayed on the left side of the meter box 109a. The right end of the zoom display bar 105 corresponds to the telephoto end, while the left end of the zoom display bar 105 corresponds to the wide angle end. In other words, the range over which the focal length can be varied (the focal length variable range) is expressed by the entire meter box 109a. In this embodiment, the maximum value 108a is 50 mm, and the minimum value 108b is 14 mm.

The zoom pointer 107 is disposed within the meter box 109a. The zoom pointer 107 is a portion that shows the current value of the focal length, and moves left or right within the meter box 109a according to how the focal length increases and decreases (that is, according to the operation of the zoom ring 64). In this embodiment, since the display meter 109 extends linearly to the left and right, the zoom pointer 107 moves linearly along the display meter 109.

For example, if the various lens groups (the first to fourth lens groups L1 to L4) are disposed at positions where the focal length is 14 mm, the zoom pointer 107 of the zoom display bar 105 is displayed at the position of 14 mm at the left end. On the other hand, if the various lens groups (the first to fourth lens groups L1 to L4) are disposed at positions where the focal length is 50 mm, the zoom pointer 107 of the zoom display bar 105 is displayed at the position of 50 mm at the right end. In the state shown in FIG. 11, the zoom display bar 105 displays that the focal length is 18 mm, and the various lens groups (the first to fourth lens groups L1 to L4) are disposed at positions where the focal length is 18 mm.

Furthermore, a display stripe 106 that is colored gray is formed by the meter box 109a and the zoom pointer 107. In this embodiment, since the display stripe 106 is formed between the zoom pointer 107 and the minimum value 108b of the focal length, the length of the display stripe 106 expresses the focal length. For example, if the zoom pointer 107 moves with respect to the display meter 109 so that the display stripe 106 becomes longer, there is a change in the state of the optical system L in the direction in which the focal length increases, that is, from the wide angle side to the telephoto side. If the zoom pointer 107 moves with respect to the display meter 109 so that the display stripe 106 becomes shorter, there is a change in the state of the optical system L in the direction in which the focal length becomes shorter, that is, from the telephoto side to the wide angle side.

The display state of this zoom display bar 105 is associated with the operation direction of the zoom ring 64. The relation between the display state of the zoom display bar 105 and the operation direction of the zoom ring 64 will be described through reference to FIGS. 12A and 12B. FIG. 12A shows the operation direction of the zoom ring 64. FIG. 12B shows the zoom display bar 105 displayed on the display unit 20. FIG. 12A shows the operation direction of the zoom ring 64 when the zoom ring 64 is viewed from the camera body 3 side in a state in which the interchangeable lens unit 2 has been mounted to the camera body 3.

In this embodiment, the operation direction (rotation direction) of the zoom ring 64 refers to the movement direction of the zoom ring 64 at a judgment position J1 (see FIG. 12A) disposed above the optical axis AZ in the vertical direction (the Y axis direction positive side) in the so-called landscape orientation. The A and B directions are directions that follow an arc around the optical axis AZ, using the judgment position J1 as a reference.

As shown in FIG. 12A, if we set a first reference line AZ1 that extends horizontally and is perpendicular to the optical axis AZ, and a second reference line AZ2 that extends vertically and is perpendicular to the first reference line AZ1 and the optical axis AZ, with respect to the interchangeable lens unit 2, the judgment position J1 is the point of intersection above the zoom ring 64 and the second reference line AZ2.

As shown in FIG. 12A, when the user turns the zoom ring 64 so that it rotates in the A direction, the state of the optical system L changes from the wide angle side to the telephoto side. In other words, when the zoom ring 64 rotates in the A direction, the focal length of the optical system L increases. On the other hand, when the user turns the zoom ring 64 so that the zoom ring 64 rotates in the B direction, the state of the optical system L changes from the telephoto side to the wide angle side. That is, when the zoom ring 64 rotates in the B direction, the focal length of the optical system L decreases.

As shown in FIG. 12B, the right end of the zoom display bar 105 corresponds to the telephoto end, and the left end of the zoom display bar 105 corresponds to the wide angle end. Accordingly, when the state of the optical system L changes from the wide angle side to the telephoto side, the zoom ring 64 rotates in the A direction, and the zoom pointer 107 moves to the right (the telephoto direction ZA) with respect to the display meter 109. As the zoom pointer 107 moves, the display stripe 106 becomes steadily longer.

On the other hand, when state of the optical system L changes from the telephoto side to the wide angle side, the zoom ring 64 rotates in the B direction, and the zoom pointer 107 moves to the left (the wide angle direction ZB) with respect to the display meter 109. As the zoom pointer 107 moves, the display stripe 106 becomes steadily shorter.

As described above, if the operation direction of the zoom ring 64 is considered using the judgment position J1 as a reference, then the operation direction of the zoom ring 64 substantially coincides with the movement direction of the zoom pointer 107 with respect to the display meter 109 (the direction in which the state of the zoom display bar 105 changes according to an increase or decrease in the focal length). More precisely, the telephoto direction ZA in which the zoom pointer 107 moves with respect to the display meter 109 (the display unit 20) substantially coincides with the arc-shaped A direction extending to the right from the judgment position J1, and the wide angle direction ZB in which the zoom pointer 107 moves with respect to the display meter 109 (the display unit 20) substantially coincides with the arc-shaped B direction extending to the left from the judgment position J1. Accordingly, if an image is captured while looking at the zoom display bar 105 displayed on the display unit 20, the user can intuitively tell which way to turn the zoom ring 64 when adjusting the focal length. This makes the camera body 3 easier to operate.

The operation direction of the zoom ring 64 is a direction that follows an arc, but whether or not the movement direction of the zoom pointer 107 coincides with the operation direction may be judged from the tangential direction at the judgment position J1 (the A1 and B1 directions shown in FIG. 12A).

The interchangeable lens unit 2 described above is such that the rotation direction of the zoom ring 64 in which the focal length increases is clockwise.

However, the relation between the operation direction of the zoom ring and whether the focal length increases or decreases may vary from one interchangeable lens unit to the next.

In view of this, with the camera body 3, the display state of the zoom display bar 105 is determined by the body microcomputer 10 on the basis of lens information stored in the interchangeable lens unit 2.

More specifically, the lens information includes operation direction information expressing the relation between the operation direction of the zoom ring 64 and the change in the focal length, and focal length information expressing the range over which the focal length of the optical system L can be varied. Whether the operation direction of the zoom ring 64 in which the focal length increases is the A direction or the B direction can be determined from the operation direction information. The focal length information includes the maximum value 108a and the minimum value 108b.

When the interchangeable lens unit 2 is mounted to the camera body 3, the body microcomputer 10 acquires lens information from the lens microcomputer 40. The body microcomputer 10 determines the display state of the zoom display bar 105 on the basis of the acquired lens information. The positions of the maximum value 108a and the minimum value 108b are an example of the display state of the zoom display bar 105.

We will now describe a situation in which the zoom display bar 105 is displayed in the upper half of the display unit 20 area (the area higher than the first line CL1 in the vertical direction).

For example, if the body microcomputer 10 determines that the operation direction of the zoom ring 64 in which the focal length increases is the A direction (clockwise) on the basis of the operation direction information contained in the lens information, then the positions of the maximum value 108a and the minimum value 108b on the zoom display bar 105 are determined by the body microcomputer 10 so that the maximum value 108a is disposed on the right side and the minimum value 108b on the left side. The maximum value 108a and the minimum value 108b are included in the focal length information of the lens information. In this embodiment, the operation direction information includes information indicating that the operation direction of the zoom ring 64 in which the focal length increases is the A direction. Therefore, the zoom display bar 105 is displayed on the display unit 20 as shown in FIG. 11.

Meanwhile, if the body microcomputer 10 determines that the operation direction of the zoom ring 64 in which the focal length increases is the B direction, then the positions of the maximum value 108a and the minimum value 108b on the zoom display bar 105 are determined by the body microcomputer 10 so that the maximum value 108a is disposed on the left side and the minimum value 108b on the right side. The display state shown in FIG. 13 corresponds to this situation. The drawings corresponding to FIGS. 12A and 12B in this case are FIGS. 14A and 14B.

When the zoom ring 64 rotates in the B direction as shown in FIG. 14A, the zoom pointer 107 moves in the telephoto direction ZA with respect to the display meter 109 as shown in FIG. 14B. When the zoom ring 64 rotates in the A direction, the zoom pointer 107 moves in the wide angle direction ZB with respect to the display meter 109.

The result of thus determining the positions of the maximum value 108a and the minimum value 108b on the basis of the operation direction information is that the movement direction of the zoom pointer 107 with respect to the display meter 109 substantially coincides with the operation direction of the zoom ring 64 at the judgment position J1. Since the display state of the zoom display bar 105 is automatically adjusted according to the specifications of the interchangeable lens unit 2, compatibility with more interchangeable lens units can be ensured.

Also, with the digital camera 1, the user can select the position of the zoom display bar 105 on the display unit 20 by using the cross control key 27, for example. In this case, the display state of the zoom display bar 105 is determined on the basis of the disposition of the zoom display bar 105.

For example, if the zoom display bar 105 is displayed in the lower half of the display unit 20 area (the area below the first line CL1 in the vertical direction), the disposition of the maximum value 108a and the minimum value 108b of the zoom display bar 105 is determined on the basis of operation direction of the zoom ring 64 at a judgment position J2 disposed below the optical axis AZ in the vertical direction. The reason for this is that, in this case, identifying the operation direction of the zoom ring 64 at the judgment position J2 disposed below the optical axis AZ makes it easier for the user to visualize the operation direction.

Figures 15A, 15B:
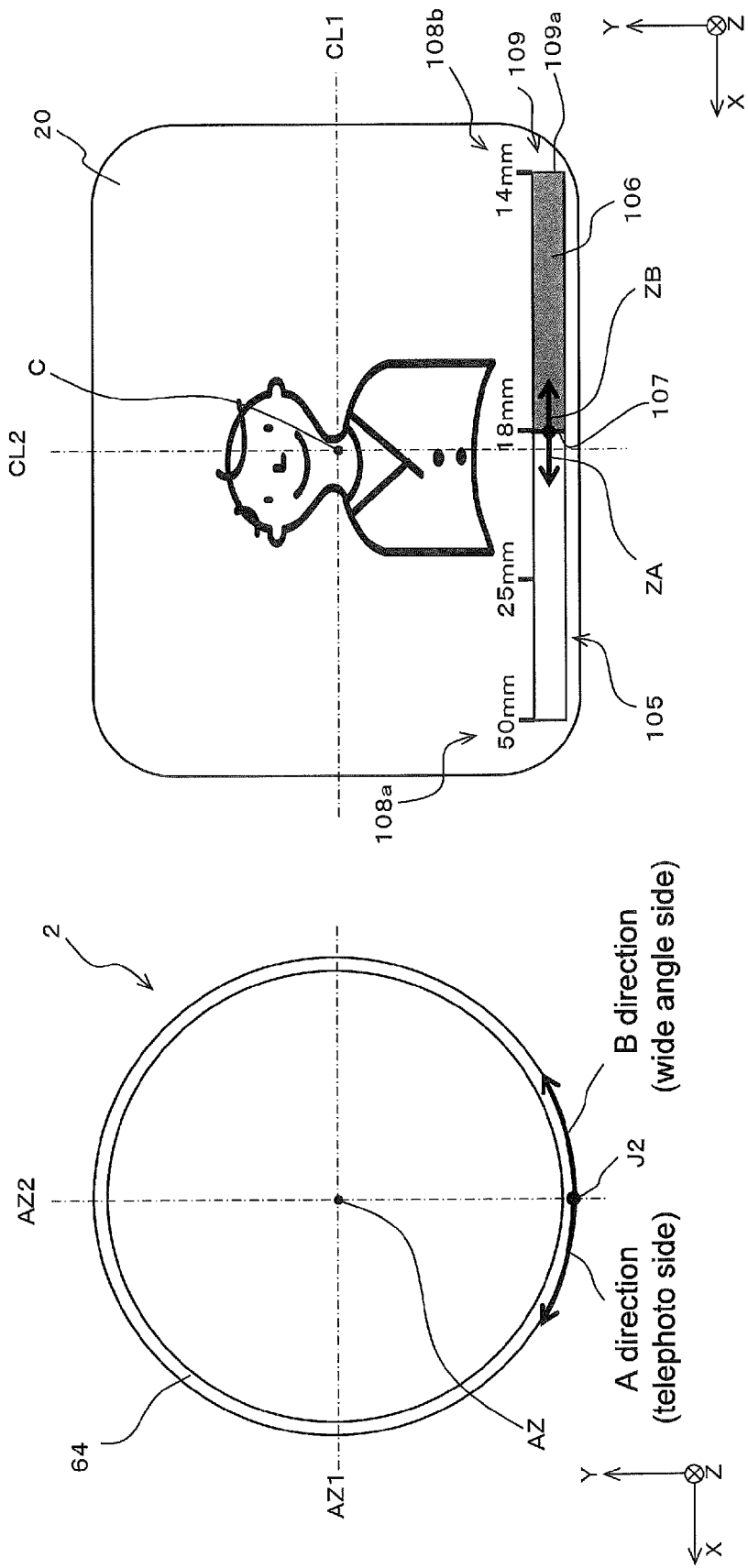
FIG. 15A is a diagram of the operation direction of the zoom ring.
FIG. 15B is an example of a zoom display bar.

As shown in FIG. 15A, if we set a first reference line AZ1 that extends horizontally and is perpendicular to the optical axis AZ, and a second reference line AZ2 that extends vertically and is perpendicular to the first reference line AZ1 and the optical axis AZ, with respect to the interchangeable lens unit 2, the judgment position J2 is the point of intersection below the zoom ring 64 and the second reference line AZ2.

As shown in FIG. 15A, if the operation direction of the zoom ring 64 is determined at the judgment position J2, the A direction (clockwise) becomes the telephoto side, and the B direction (counter-clockwise) the wide angle side. The display state of the zoom display bar 105 is adjusted by the image display controller 21 or the body microcomputer 10 so that the maximum value 108a on the left side of the display meter 109 and the minimum value 108b on the right side of the display meter 109 will be disposed as shown in FIG. 15B, on the basis of this operation direction. Consequently, it is easy for the user to tell which way to turn the zoom ring 64 in adjusting the focal length, regardless of the disposition of the zoom display bar 105.

3: Features of Digital Camera

The features of the digital camera 1 described above will be compiled below.

(1)

With this camera body 3, the display unit 20 is controlled by the image display controller 21 and the body microcomputer 10 so that the operation direction of the zoom ring 64 substantially coincides with the direction in which the zoom pointer 107 moves with respect to the display meter 109. Accordingly, when an image is captured while looking at the zoom display bar 105 displayed on the display unit 20, the user can intuitively tell which way to turn the zoom ring 64 when adjusting the focal length of the optical system L. This makes the camera body 3 easier to operate.

(2)

With this camera body 3, the body microcomputer 10 acquires lens information stored in the memory 44 of the interchangeable lens unit 2. The acquired lens information includes operation direction information expressing the relation between the operation direction of the zoom ring 64 and the increase or decrease in the focal length. The body microcomputer 10 determines the display state of the zoom display bar 105 on the display unit 20 on the basis of this operation direction information. More specifically, the disposition of the maximum value 108a and the minimum value 108b on the zoom display bar 105 is determined by the body microcomputer 10 so that the operation direction of the zoom ring 64 will substantially coincide with the movement direction of the zoom pointer 107. Accordingly, the operation direction of the zoom ring and the movement direction of the zoom pointer 107 can be made to substantially coincide according to the specifications of the interchangeable lens unit even if the relation between the operation direction and the increase or decrease in focal length varies from one interchangeable lens unit to the next. Consequently, compatibility with more interchangeable lens units can be ensured with this camera body 3.

(3)

With this camera body 3, since the lens information includes focal length information expressing the range over which the focal length of the optical system L can be varied, the display state of the zoom display bar 105 can be adjusted to match the specifications of the interchangeable lens unit even if the range over which the focal length can be varied is different from one interchangeable lens unit to the next. More specifically, since the body microcomputer 10 determines the disposition of the focal length information on the display meter 109 of the zoom display bar 105 on the basis of operation direction information, the display state of the zoom display bar 105 can be optimized according to the specifications of the interchangeable lens unit. Consequently, compatibility with more interchangeable lens units can be ensured with this camera body 3.

(4)

With this camera body 3, the display positions of the maximum value 108a and the minimum value 108b on the zoom display bar 105 are determined on the basis of the position of the zoom display bar 105 in the display area of the display unit 20. Therefore, when the zoom display bar 105 is disposed in the upper half of the display unit 20 area as shown in FIGS. 11 and 12B, for example, the body microcomputer 10 determines the display positions of the maximum value 108a and the minimum value 108b using the operation direction of the zoom ring 64 at the judgment position J1 as a reference, as shown in FIG. 12A. Consequently, it is easier for the user to visualize which way the zoom ring 64 should be turned in adjusting the focal length of the optical system L.

(5)

With this camera body 3, since the focal length is expressed by the length of the colored display stripe 106, the user can intuitively gauge the current focal length by looking at the zoom display bar 105.

4: Modification Examples

In the above embodiment, the zoom display bar 105 was linear, but the zoom display bar 105 may instead be arc-shaped.

Figure 16:
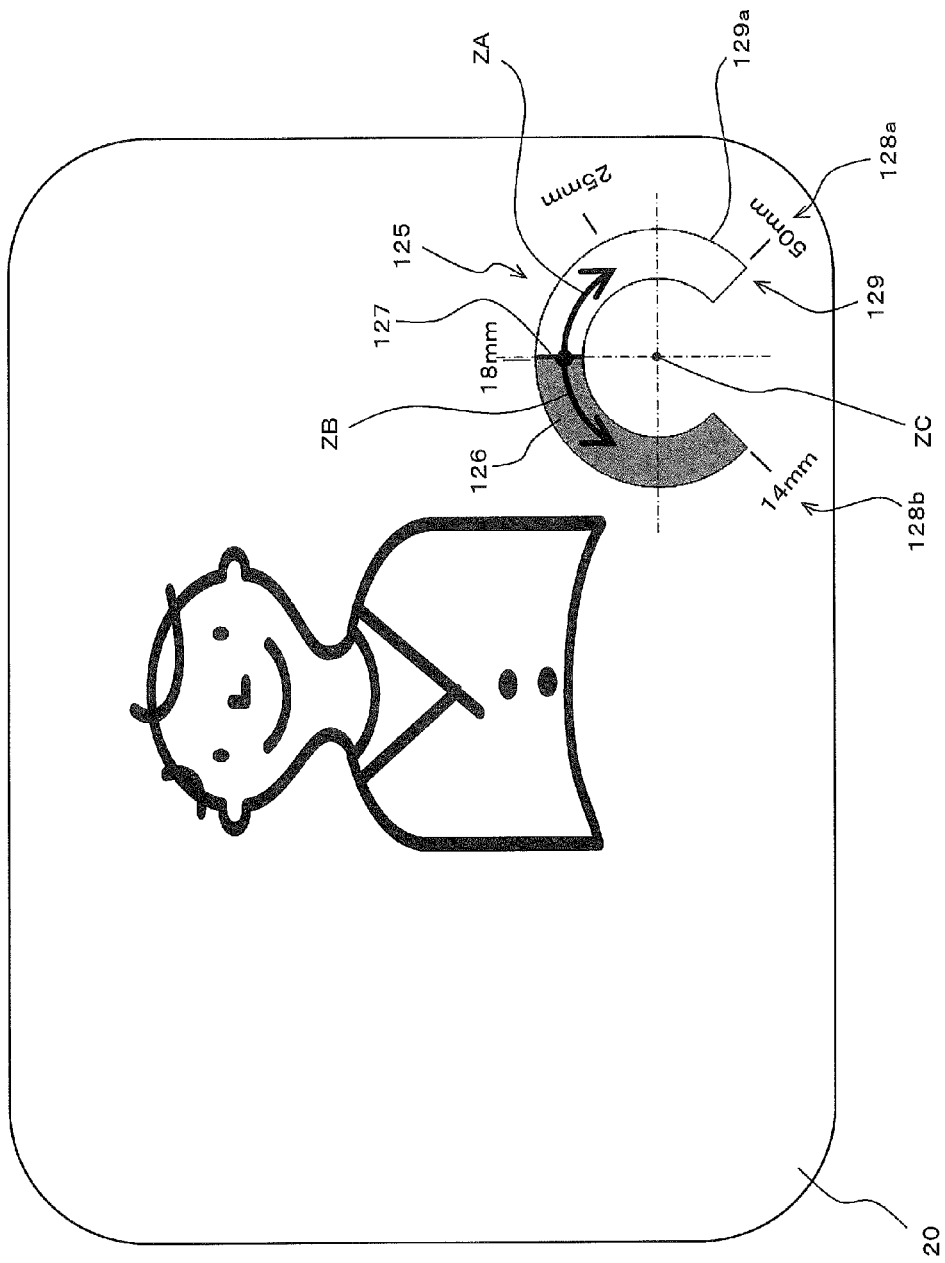
FIG. 16 is an example of a zoom display bar.
Figure 17:
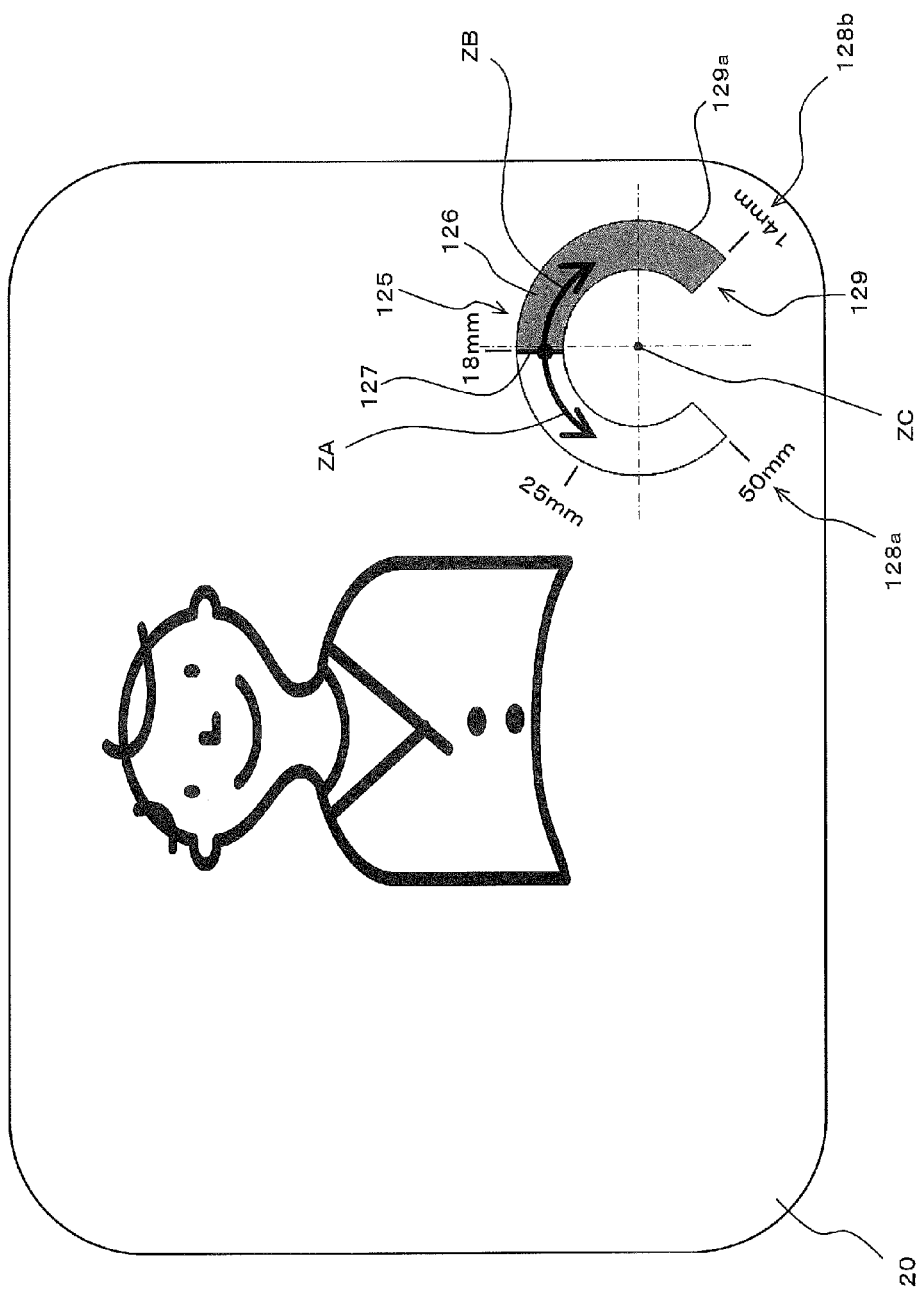
FIG. 17 is an example of a zoom display bar.

For example, as shown in FIGS. 16 and 17, the focal length may be expressed using an arc-shaped zoom display bar 125 (an example of a state indicator). This zoom display bar 125 has a display meter 129 and a zoom pointer 127. The display meter 129 has an arc-shaped meter box 129a whose center is the point ZC. The focal length is displayed around the meter box 129a. A display stripe 126 that is colored gray is formed by the meter box 129a and the zoom pointer 127. The current focal length is expressed by the length of the display stripe 126.

The zoom display bar 125 shown in FIG. 16 corresponds to the zoom display bar 105 shown in FIGS. 11 and 12B. That is, the zoom display bar 125 shown in FIG. 16 corresponds to a case in which the operation direction of the zoom ring 64 in which the focal length increases is the A direction (clockwise). The body microcomputer 10 determines the disposition of the maximum value 128a and the minimum value 128b in the zoom display bar 125 so that the direction in which the zoom pointer 127 rotates substantially coincides with the A direction when the focal length is increased.

More specifically, with the zoom display bar 125 shown in FIG. 16, the maximum value 128a (50 mm) is displayed at the end of the meter box 129a in the clockwise direction, and the minimum value 128b (14 mm) is displayed at the end of the meter box 129a in the counter-clockwise direction. Accordingly, when the zoom ring 64 is rotated in the A direction and the focal length of the optical system L is increased, the zoom pointer 127 rotates in the telephoto direction ZA (clockwise) around the point ZC. When the zoom ring 64 is rotated in the B direction to reduce the focal length of the optical system L, the zoom pointer 127 rotates in the wide angle direction ZB (counter-clockwise) around the point ZC. That is, the rotation direction of the zoom ring 64 coincides with the rotation direction of the zoom pointer 127.

Figure 13:
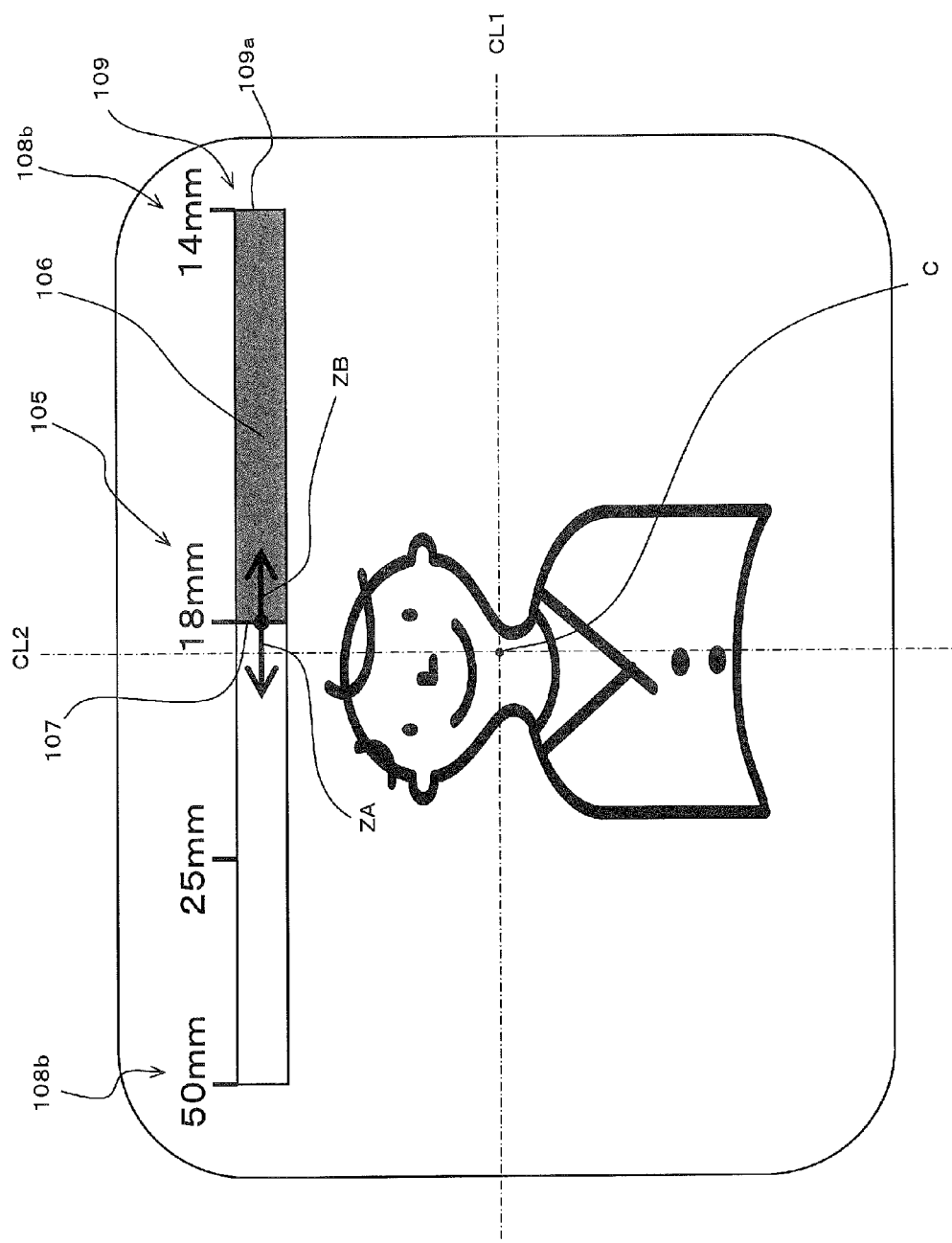
FIG. 13 is an example of a zoom display bar.

Meanwhile, the zoom display bar 125 shown in FIG. 17 corresponds to the zoom display bar 105 shown in FIGS. 13 and 14B. That is, the zoom display bar 125 shown in FIG. 17 corresponds to a case in which the operation direction of the zoom ring 64 in which the focal length increases is the B direction (counter-clockwise). The body microcomputer 10 determines the disposition of the maximum value 128a and the minimum value 128b in the zoom display bar 125 so that the B direction coincides with the direction in which the zoom pointer 127 rotates when the focal length is increased.

More specifically, with the zoom display bar 125 shown in FIG. 17, the maximum value 128a (50 mm) is displayed at the end of the meter box 129a in the counter-clockwise direction, and the minimum value 128b (14 mm) is displayed at the end of the meter box 129a in the clockwise direction. Accordingly, when the zoom ring 64 is rotated in the B direction to increase the focal length of the optical system L, the zoom pointer 127 rotates in the telephoto direction ZA (counter-clockwise) around the point ZC. When the zoom ring 64 is rotated in the A direction to reduce the focal length of the optical system L, the zoom pointer 127 rotates in the wide angle direction ZB (clockwise) around the point ZC. That is, the rotation direction of the zoom ring 64 coincides with the rotation direction of the zoom pointer 127.

Since the rotation direction of the zoom ring 64 thus coincides with the rotation direction of the zoom pointer 127, when an image is captured while looking at the zoom display bar 125 displayed on the display unit 20, the user can easily tell which way to turn the zoom ring 64 when adjusting the focal length of the optical system L. Consequently, the camera is easier to operate even with a display format such as the zoom display bar 125.

Also, just as with the zoom display bar 105, with the zoom display bar 125 the current focal length is expressed by the length of the display stripe 126, so the user can intuitively gauge the current focal length by looking at the zoom display bar 125.

In particular, the rotation direction of the zoom ring 64 will be even easier to ascertain than with the linear zoom display bar 105 since the arc-shaped zoom display bar 125 is such that the rotation direction of the zoom ring 64 coincides with the rotation direction of the zoom pointer 127.

The zoom display bar 125 here is arc-shaped, but the same effect will be obtained if the zoom display bar 125 is annular in shape.

The zoom display bars 105 and 125 do not need to be displayed at all times on the display unit 20, and the constitution may be such that the zoom display bars 105 and 125 are displayed when the first rotation detector 65 detects the rotational operation of the zoom ring 64, and the display of the zoom display bars 105 and 125 is automatically cancelled when the rotational operation of the zoom ring 64 is ended. Alternatively, the constitution may be such that the zoom display bars 105 and 125 are always displayed on the display unit 20 up until the shutter button 30 is pressed, and the display of the zoom display bars 105 and 125 is automatically cancelled after the shutter button 30 is pressed halfway down.

If the zoom display bars 105 and 125 have a display format such that the gray display stripes 106 and 126 change to another color, or the display stripes 106 and 126 flash on and off, for example, when focus has been confirmed by the body microcomputer 10 after the shutter button 30 is pressed halfway down, then the user will be instantly able to tell whether the camera is in focus.

Second Embodiment

1: Object Distance Display

Figure 18:
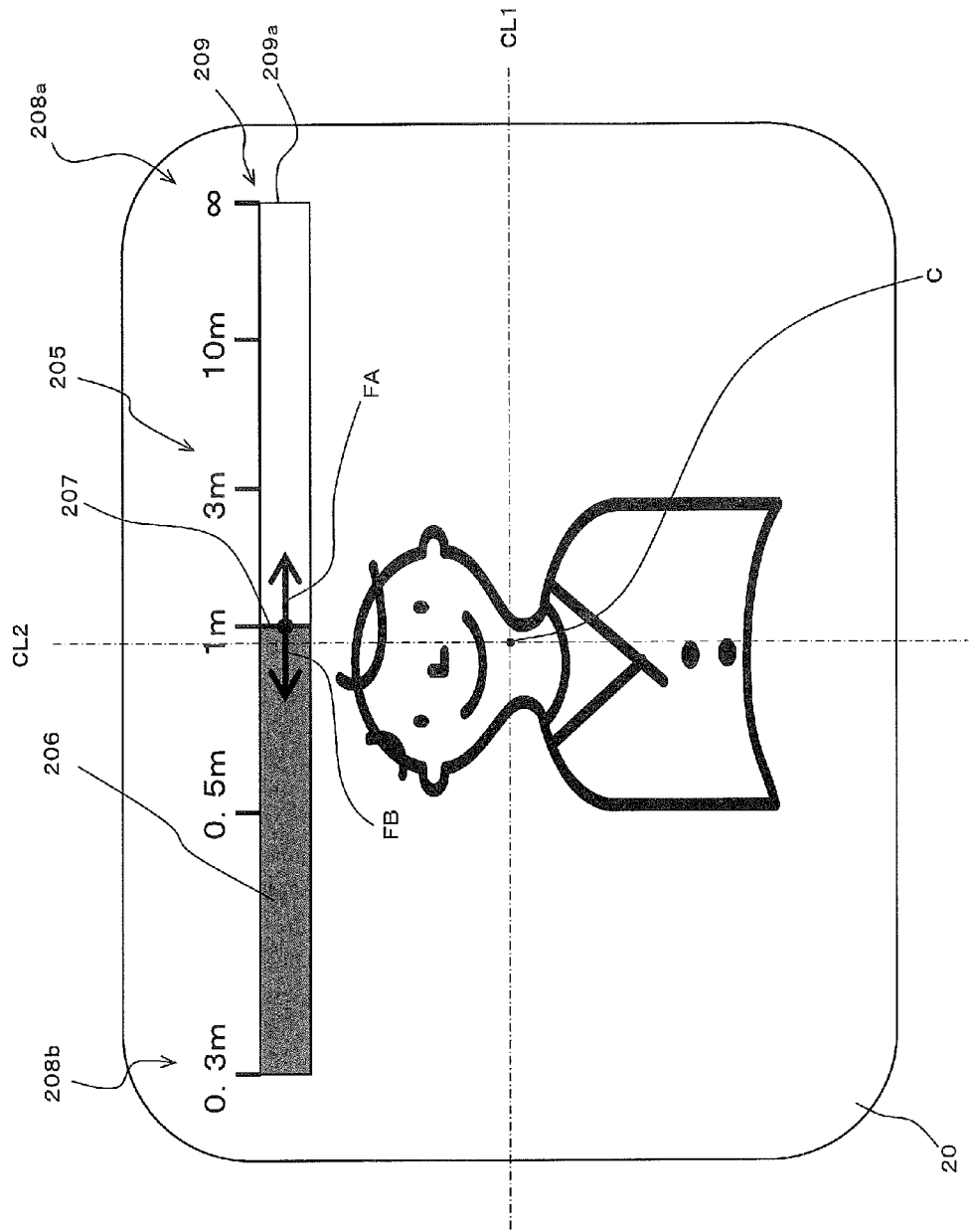
FIG. 18 is an example of a focus display bar.

In the above embodiment, the zoom display bar 105 and the zoom display bar 125 express the focal length, but the same constitution is conceivable for the object distance of a subject that can be varied by the focus ring 67. A second embodiment will be described through reference to FIG. 18. FIG. 18 shows a focus display bar 205.

Components that have substantially the same function as in the constitution of the above embodiment will be numbered the same, and will not be described again in detail.

As shown in FIG. 18, the focus display bar 205 is disposed in the upper half of the display unit 20 area. More specifically, two lines that are perpendicular to each other and pass through the center C of the display unit 20 shall be termed a first line CL1 and a second line CL2. In the so-called landscape orientation, the first line CL1 is parallel to the horizontal direction, and the second line CL2 is parallel to the vertical direction. In the state shown in FIG. 18, the focus display bar 205 is disposed above the first line CL1. More precisely, the focus display bar 205 is disposed in the upper part of the display area of the display unit 20.

As shown in FIG. 18, the focus display bar 205 is proportional to the object distance (the position of the second lens group L2 in the Z axis direction), and has a display meter 209 that shows object distance information, and a focus pointer 207 that shows the current value of the object distance of the optical system L. The display meter 209 has a substantially rectangular meter box 209a that extends to the left and right. The object distance is displayed above the meter box 209a. For example, the maximum value 208a for object distance is displayed at the right end of the meter box 209a, and the minimum value 208b for object distance is displayed on the left side of the meter box 209a. In other words, the range over which the object distance can be varied (the object distance variable range) is expressed by the entire meter box 209a. In this embodiment, the maximum value 208a is infinity (∞), and the minimum value 208b is 0.3 m.

The focus pointer 207 is disposed within the meter box 209a. The focus pointer 207 is a portion that shows the current value of the object distance, and moves left or right within the meter box 209a according to how the object distance increases and decreases (that is, according to the operation of the focus ring 67). In this embodiment, since the display meter 209 extends linearly to the left and right, the focus pointer 207 moves linearly along the display meter 209.

For example, if the second lens group L2 is disposed at a position where the object distance is 0.3 m, the focus pointer 207 of the focus display bar 205 is displayed at the position of 0.3 m at the left end. On the other hand, if the second lens group L2 is disposed at a position where the object distance is infinity, the focus pointer 207 is displayed at the position of infinity at the right end. In the state shown in FIG. 18, the focus display bar 205 displays that the object distance is 1 m, and displays that the second lens group L2 is disposed at the position where the object distance is 1 m.

Furthermore, a display stripe 206 that is colored gray is formed by the meter box 209a and the focus pointer 207. In this embodiment, since the display stripe 206 is formed between the focus pointer 207 and the minimum value 208b of the object distance, the length of the display stripe 206 expresses the object distance. For example, if the focus pointer 207 moves with respect to the display meter 209 so that the display stripe 206 becomes longer, there is a change in the state of the optical system L in the direction in which the object distance increases, that is, from the near side to the infinity side. If the focus pointer 207 moves with respect to the display meter 209 so that the display stripe 206 becomes shorter, there is a change in the state of the optical system L in the direction in which the object distance becomes shorter, that is, from the infinity side to the near side.

The display state of this focus display bar 205 is associated with the operation direction of the focus ring 67. The relation between the display state of the focus display bar 205 and the operation direction of the focus ring 67 will be described through reference to FIGS. 19A and 19B. FIG. 19A shows the operation direction of the focus ring 67. FIG. 19B shows the focus display bar 205 displayed on the display unit 20. FIG. 19A shows the operation direction of the focus ring 67 when the focus ring 67 is viewed from the camera body 3 side in a state in which the interchangeable lens unit 2 has been mounted to the camera body 3. FIGS. 19A and 19B correspond to FIGS. 12A and 12B in the first embodiment above.

In this embodiment, the operation direction (rotation direction) of the focus ring 67 refers to the movement direction of the focus ring 67 at a judgment position J1 (see FIG. 19A) disposed above the optical axis AZ in the vertical direction (the Y axis direction positive side) in the so-called landscape orientation. The A and B directions are directions that follow an arc around the optical axis AZ, using the judgment position J1 as a reference.

As shown in FIG. 19A, if we set a first reference line AZ1 that extends horizontally and is perpendicular to the optical axis AZ, and a second reference line AZ2 that extends vertically and is perpendicular to the first reference line AZ1 and the optical axis AZ, with respect to the interchangeable lens unit 2, the judgment position J1 is the point of intersection above the focus ring 67 and the second reference line AZ2.

As shown in FIG. 19A, when the user turns the focus ring 67 so that it rotates in the A direction, the state of the optical system L changes from the near side to the infinity side. In other words, when the focus ring 67 rotates in the A direction, the object distance of the optical system L increases. On the other hand, when the user turns the focus ring 67 so that the focus ring 67 rotates in the B direction, the state of the optical system L changes from the infinity side to the near side. That is, when the focus ring 67 rotates in the B direction, the object distance of the optical system L decreases.

As shown in FIG. 19B, the right end of the focus display bar 205 corresponds to the infinity side, and the left end of the focus display bar 205 corresponds to the near side. Accordingly, when the state of the optical system L changes from the near side to the infinity side, the focus ring 67 rotates in the A direction, and the focus pointer 207 moves to the right (the infinity direction FA) with respect to the display meter 209. As the focus pointer 207 moves, the display stripe 206 becomes steadily longer.

On the other hand, when state of the optical system L changes from the infinity side to the near side, the focus ring 67 rotates in the B direction, and the focus pointer 207 moves to the left (the near direction FB) with respect to the display meter 209. As the focus pointer 207 moves, the display stripe 206 becomes steadily shorter.

As described above, if the operation direction of the focus ring 67 is determined using the judgment position J1 as a reference, then the operation direction of the focus ring 67 substantially coincides with the movement direction of the focus pointer 207 with respect to the display meter 209 (the direction in which the state of the focus display bar 205 changes according to an increase or decrease in the object distance). More precisely, the infinity direction FA in which the focus pointer 207 moves with respect to the display meter 209 (the display unit 20) substantially coincides with the arc-shaped A direction extending to the right from the judgment position J1, and the near direction FB in which the focus pointer 207 moves with respect to the display meter 209 (the display unit 20) substantially coincides with the arc-shaped B direction extending to the left from the judgment position J1. Accordingly, if an image is captured while looking at the focus display bar 205 displayed on the display unit 20, the user can easily tell which way to turn the focus ring 67 when adjusting the object distance. This makes the camera body 3 easier to operate.

The operation direction of the focus ring 67 is a direction that follows an arc, but whether or not the movement direction of the focus pointer 207 coincides with the operation direction may be judged from the tangential direction at the judgment position J1 (the A2 and B2 directions shown in FIG. 19A).

The interchangeable lens unit 2 described above is such that the rotation direction of the focus ring 67 in which the object distance increases is clockwise.

However, the relation between the operation direction of the focus ring and whether the object distance increases or decreases may vary from one interchangeable lens unit to the next.

In view of this, with the camera body 3, just as in the above embodiment, the display state of the focus display bar 205 is determined by the body microcomputer 10 on the basis of lens information stored in the interchangeable lens unit 2.

More specifically, the lens information includes operation direction information expressing the relation between the operation direction of the focus ring 67 and the change in the object distance, and object distance information expressing the range over which the object distance of the optical system L can be varied. Whether the operation direction of the focus ring 67 in which the object distance increases is the A direction or the B direction can be determined from the operation direction information. The object distance information includes the maximum value 208a and the minimum value 208b.

When the interchangeable lens unit 2 is mounted to the camera body 3, the body microcomputer 10 acquires lens information from the lens microcomputer 40. The body microcomputer 10 determines the display state of the focus display bar 205 on the basis of the acquired lens information. The positions of the maximum value 208a and the minimum value 208b are an example of the display state of the focus display bar 205.

We will now describe a situation in which the focus display bar 205 is displayed in the upper half of the display unit 20 area (the area higher than the first line CL1 in the vertical direction).

For example, if the body microcomputer 10 determines that the operation direction of the focus ring 67 in which the object distance increases is the A direction (clockwise) on the basis of the operation direction information contained in the lens information, then the positions of the maximum value 208a and the minimum value 208b on the focus display bar 205 are determined by the body microcomputer 10 so that the maximum value 208a is disposed on the right side and the minimum value 208b on the left side. The maximum value 208a and the minimum value 208b are included in the object distance information of the lens information. In this embodiment, the operation direction information includes information indicating that the operation direction of the focus ring 67 in which the object distance increases is the A direction. Therefore, the focus display bar 205 is displayed on the display unit 20 as shown in FIG. 18.

Meanwhile, if the body microcomputer 10 determines that the operation direction of the focus ring 67 in which the object distance increases is the B direction, then the positions of the maximum value 208a and the minimum value 208b on the focus display bar 205 are determined by the body microcomputer 10 so that the maximum value 208a is disposed on the left side and the minimum value 208b on the right side. The display state shown in FIG. 20 corresponds to this situation. The drawings corresponding to FIGS. 19A and 19B in this case are FIGS. 21A and 21B.

When the focus ring 67 rotates in the B direction as shown in FIG. 21A, the focus pointer 207 moves in the infinity direction FA with respect to the display meter 209 as shown in FIG. 21B. When the focus ring 67 rotates in the A direction, the focus pointer 207 moves in the near direction FB with respect to the display meter 209.

The result of thus determining the positions of the maximum value 208a and the minimum value 208b on the basis of the operation direction information is that the movement direction of the focus pointer 207 with respect to the display meter 209 substantially coincides with the operation direction of the focus ring 67 at the judgment position J1. Since the display state of the focus display bar 205 is automatically adjusted according to the specifications of the interchangeable lens unit 2, compatibility with more interchangeable lens units can be ensured.

Also, with the digital camera 1, the user can select the position of the focus display bar 205 on the display unit 20 by using the cross control key 27, for example. In this case, the display state of the focus display bar 205 is determined on the basis of the disposition of the focus display bar 205.

For example, if the focus display bar 205 is displayed in the lower half of the display unit 20 area (the area below the first line CL1 in the vertical direction), the disposition of the maximum value 208a and the minimum value 208b of the focus display bar 205 is determined on the basis of operation direction of the focus ring 67 at a judgment position J2 disposed below the optical axis AZ in the vertical direction. The reason for this is that, in this case, identifying the operation direction of the focus ring 67 at the judgment position J2 disposed below the optical axis AZ makes it easier for the user to visualize the operation direction.

Figure 22B:
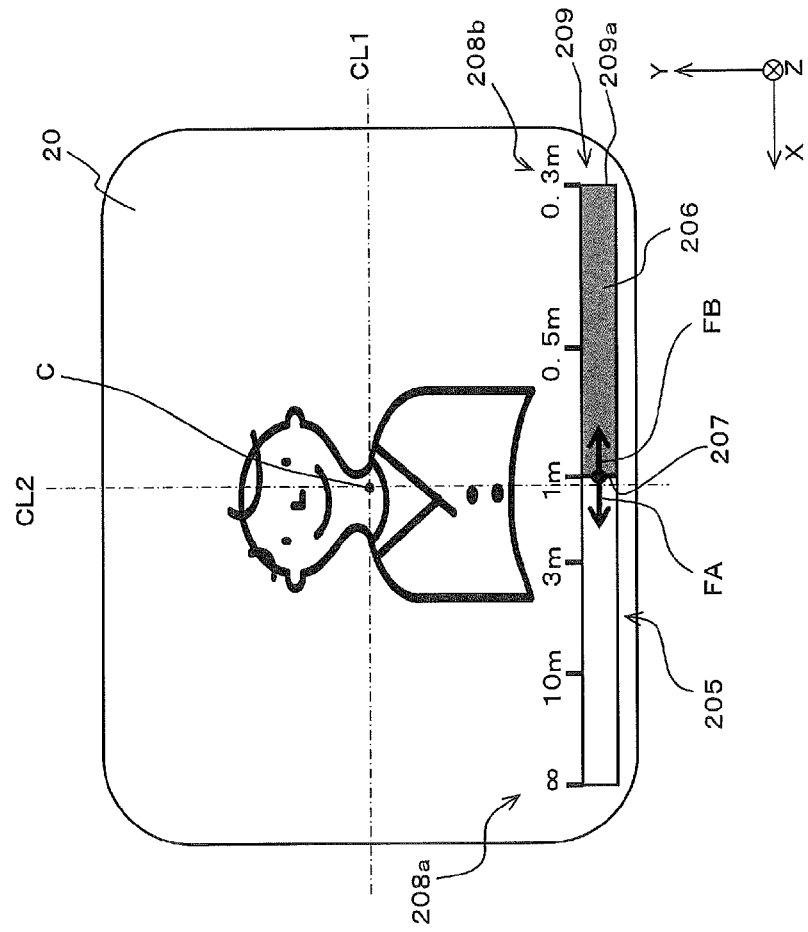
FIG. 22B is an example of a focus display bar.
Figure 22A:
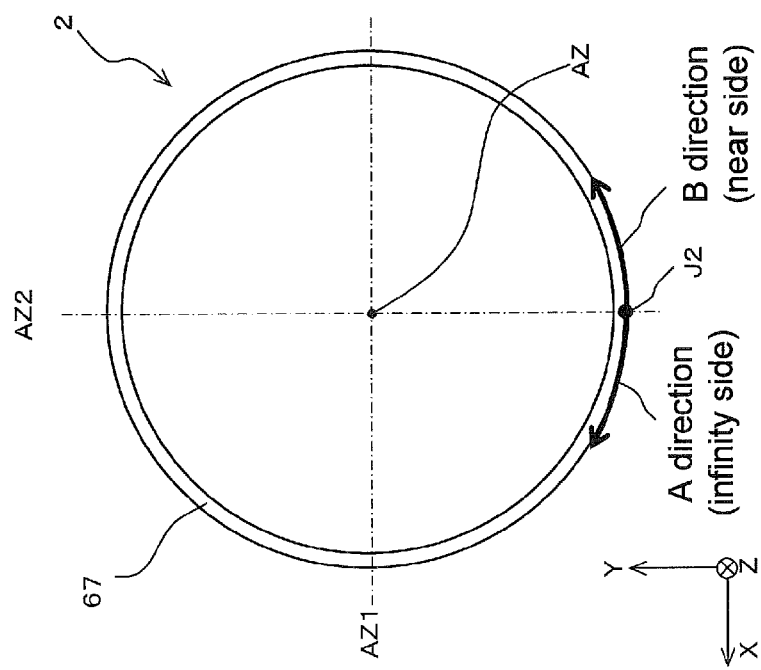
FIG. 22A is a diagram of the operation direction of the focus ring.

As shown in FIG. 22A, if we set a first reference line AZ1 that extends horizontally and is perpendicular to the optical axis AZ, and a second reference line AZ2 that extends vertically and is perpendicular to the first reference line AZ1 and the optical axis AZ, with respect to the interchangeable lens unit 2, the judgment position J2 is the point of intersection below the focus ring 67 and the second reference line AZ2.

As shown in FIG. 22A, if the operation direction of the focus ring 67 is determined at the judgment position J2, the A direction (clockwise) becomes the infinity side, and the B direction (counter-clockwise) the near side. The display state of the focus display bar 205 is adjusted by the image display controller 21 or the body microcomputer 10 so that the maximum value 208a on the left side of the display meter 209 and the minimum value 208b on the right side of the display meter 209 will be disposed as shown in FIG. 22B, on the basis of this operation direction. Consequently, it is easy for the user to tell which way to turn the focus ring 67 in adjusting the object distance, regardless of the disposition of the focus display bar 205.

2: Features of Digital Camera

The digital camera 1 described above has the following features.

(1)

With this camera body 3, the display unit 20 is controlled by the image display controller 21 and the body microcomputer 10 so that the operation direction of the focus ring 67 substantially coincides with the direction in which the focus pointer 207 moves with respect to the display meter 209. Accordingly, when an image is captured while looking at the focus display bar 205 displayed on the display unit 20, the user can intuitively tell which way to turn the focus ring 67 when adjusting the object distance of the optical system L. This makes the camera body 3 easier to operate.

(2)

With this camera body 3, the body microcomputer 10 acquires lens information stored in the memory 44 of the interchangeable lens unit 2. The acquired lens information includes operation direction information expressing the relation between the operation direction of the focus ring 67 and the increase or decrease in the object distance. The body microcomputer 10 determines the display state of the focus display bar 205 on the display unit 20 on the basis of this operation direction information. More specifically, the disposition of the maximum value 208a and the minimum value 208b on the focus display bar 205 is determined by the body microcomputer 10 so that the operation direction of the focus ring 67 will substantially coincide with the movement direction of the focus pointer 207. Accordingly, the operation direction of the focus ring and the movement direction of the focus pointer 207 can be made to substantially coincide according to the specifications of the interchangeable lens unit even if the relation between the operation direction and the increase or decrease in object distance varies from one interchangeable lens unit to the next. Consequently, compatibility with more interchangeable lens units can be ensured with this camera body 3.

(3)

With this camera body 3, since the lens information includes object distance information expressing the range over which the object distance of the optical system L can be varied, the display state of the focus display bar 205 can be adjusted to match the specifications of the interchangeable lens unit even if the range over which the object distance can be varied is different from one interchangeable lens unit to the next. More specifically, since the body microcomputer 10 determines the disposition of the object distance information on the display meter 209 of the focus display bar 205 on the basis of operation direction information, the display state of the focus display bar 205 can be optimized according to the specifications of the interchangeable lens unit. Consequently, compatibility with more interchangeable lens units can be ensured with this camera body 3.

(4)

With this camera body 3, the display positions of the maximum value 208a and the minimum value 208b on the focus display bar 205 are determined on the basis of the position of the focus display bar 205 in the display area of the display unit 20. Therefore, when the focus display bar 205 is disposed in the upper half of the display unit 20 area as shown in FIGS. 18 and 19B, for example, the body microcomputer 10 determines the display positions of -the maximum value 208a and the minimum value 208b using the operation direction of the focus ring 67 at the judgment position J1 as a reference, as shown in FIG. 19A. Consequently, it is easier for the user to visualize which way the focus ring 67 should be turned in adjusting the object distance of the optical system L.

(5)

With this camera body 3, since the focal length is expressed by the length of the colored display stripe 206, the user can intuitively gauge the current focal length by looking at the focus display bar 205.

3: Modification Examples

In the above embodiment, the focus display bar 205 was linear, but the focus display bar 205 may instead be arc-shaped.

Figure 23:
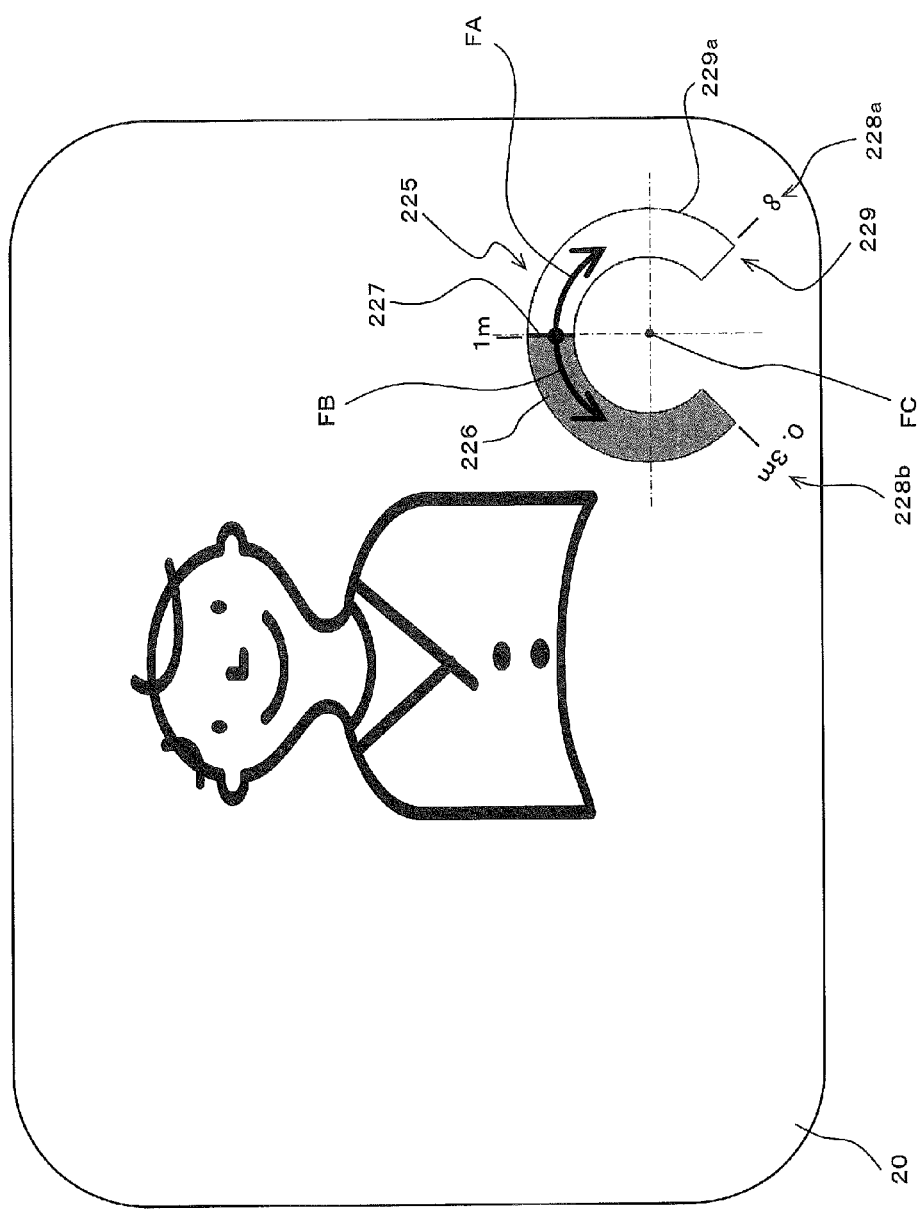
FIG. 23 is an example of a focus display bar.
Figure 24:
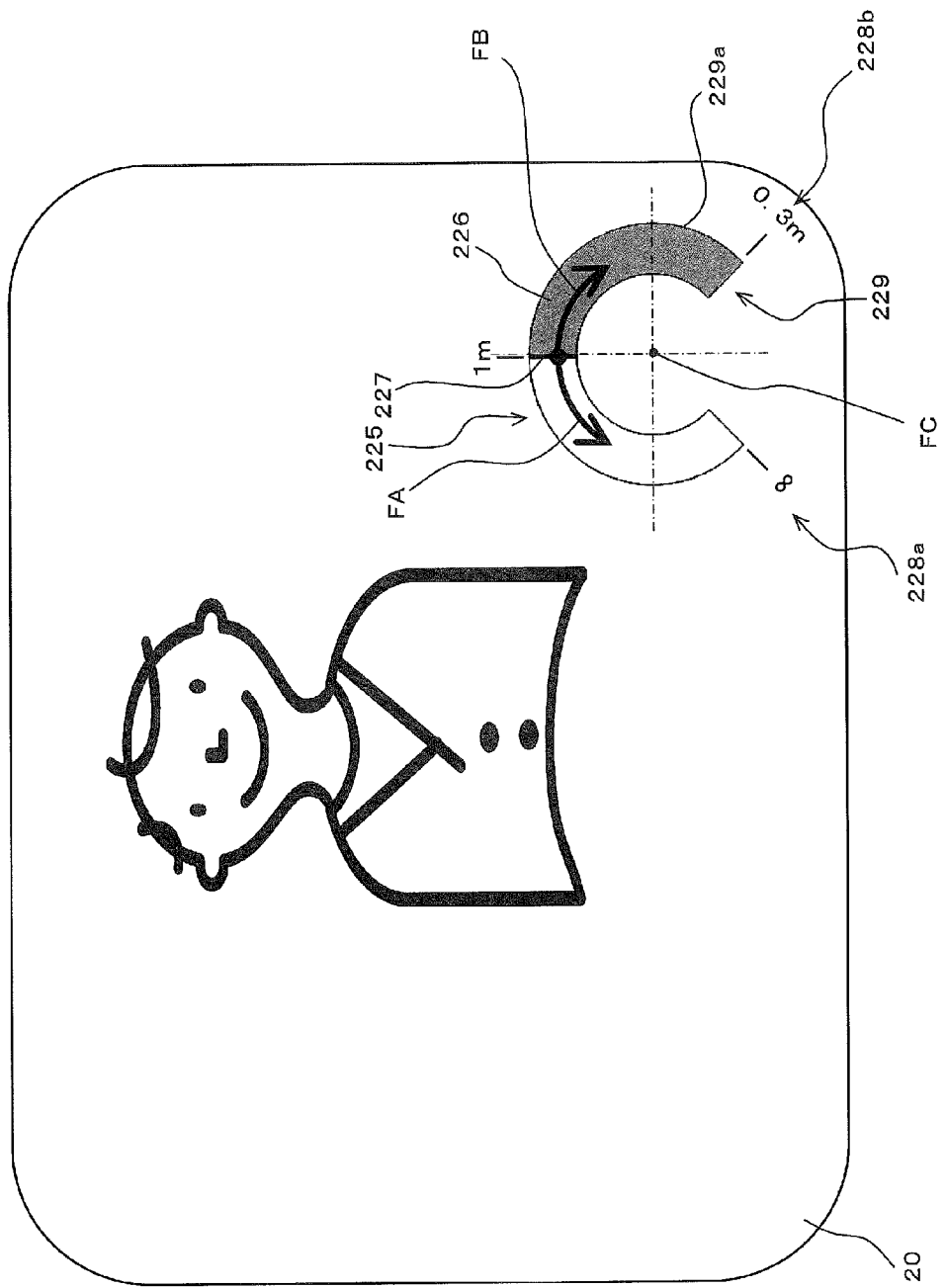
FIG. 24 is an example of a focus display bar.

For example, as shown in FIGS. 23 and 24, the object distance may be expressed using an arc-shaped focus display bar 225 (an example of a state indicator). This focus display bar 225 has a display meter 229 and a focus pointer 227. The display meter 229 has an arc-shaped meter box 229a whose center is the point ZC. The object distance is displayed around the meter box 229a. A display stripe 226 that is colored gray is formed by the meter box 229a and the focus pointer 227. The current object distance is expressed by the length of the display stripe 226.

The focus display bar 225 shown in FIG. 23 corresponds to the focus display bar 205 shown in FIGS. 18 and 19B. That is, the focus display bar 225 shown in FIG. 23 corresponds to a case in which the operation direction of the focus ring 67 in which the object distance increases is the A direction (clockwise). The body microcomputer 10 determines the disposition of the maximum value 228a and the minimum value 228b in the focus display bar 225 so that the direction in which the focus pointer 227 rotates substantially coincides with the A direction when the object distance is increased.

More specifically, with the focus display bar 225 shown in FIG. 23, the maximum value 228a (∞) is displayed at the end of the meter box 229a in the clockwise direction, and the minimum value 228b (0.3 m) is displayed at the end of the meter box 229a in the counter-clockwise direction. Accordingly, when the focus ring 67 is rotated in the A direction and the object distance of the optical system L is increased, the focus pointer 227 rotates in the infinity direction FA (clockwise) around the point FC. When the focus ring 67 is rotated in the B direction to reduce the object distance of the optical system L, the focus pointer 227 rotates in the near direction FB (counter-clockwise) around the point FC. That is, the rotation direction of the focus ring 67 coincides with the rotation direction of the focus pointer 227.

Figure 20:
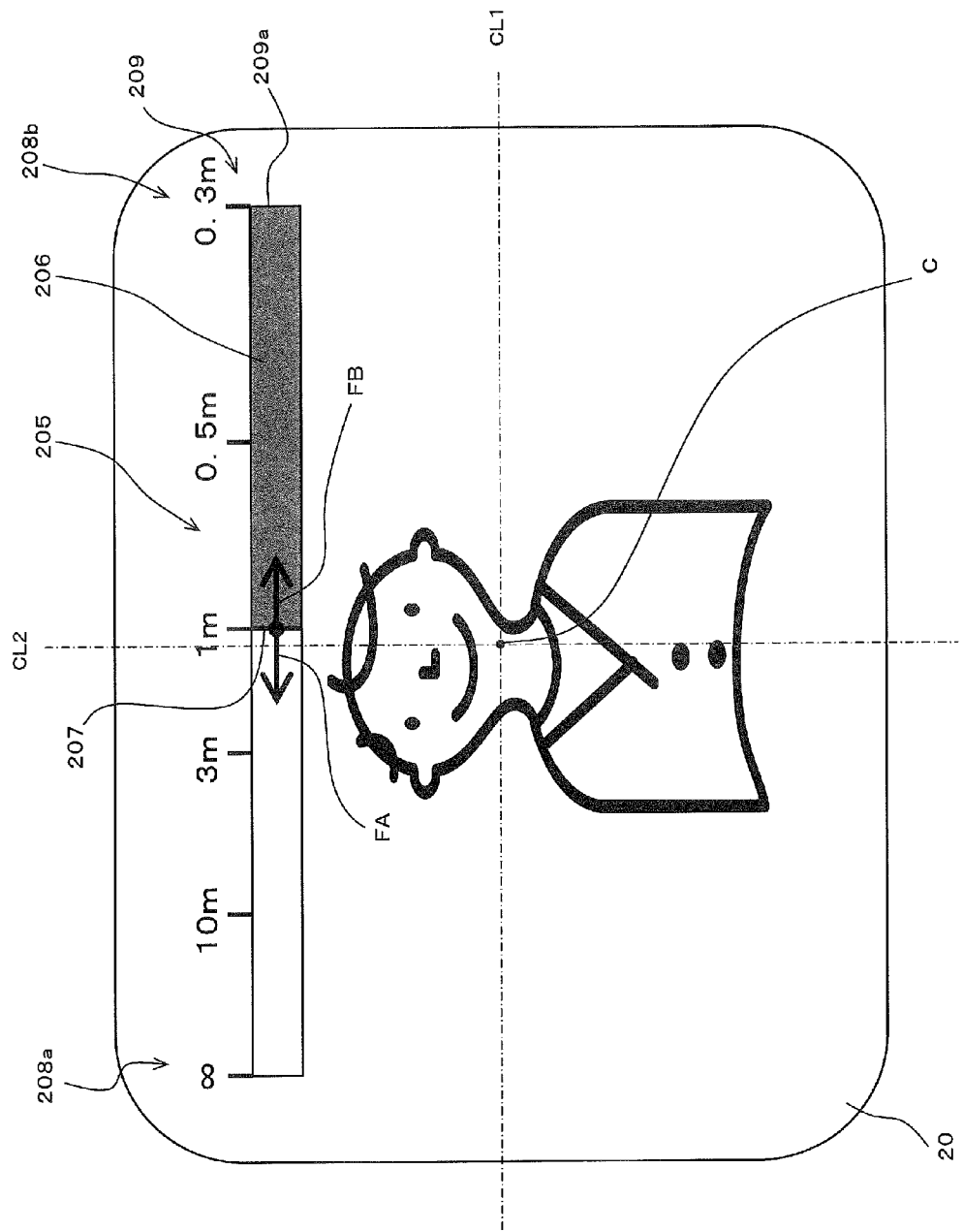
FIG. 20 is an example of a focus display bar.

Meanwhile, the focus display bar 225 shown in FIG. 24 corresponds to the focus display bar 205 shown in FIGS. 20 and 21B. That is, the focus display bar 225 shown in FIG. 24 corresponds to a case in which the operation direction of the focus ring 67 in which the object distance increases is the B direction (counter-clockwise). The body microcomputer 10 determines the disposition of the maximum value 228a and the minimum value 228b in the focus display bar 225 so that the B direction coincides with the direction in which the focus pointer 227 rotates when the object distance is increased.

More specifically, with the focus display bar 225 shown in FIG. 24, the maximum value 228a (∞) is displayed at the end of the meter box 229a in the counter-clockwise direction, and the minimum value 228b (0.3 m) is displayed at the end of the meter box 229a in the clockwise direction. Accordingly, when the focus ring 67 is rotated in the B direction to increase the object distance of the optical system L, the focus pointer 227 rotates in the infinity direction FA (counter-clockwise) around the point FC. When the focus ring 67 is rotated in the A direction to reduce the object distance of the optical system L, the focus pointer 227 rotates in the near direction FB (clockwise) around the point FC. That is, the rotation direction of the focus ring 67 coincides with the rotation direction of the focus pointer 227.

Since the rotation direction of the focus ring 67 thus coincides with the rotation direction of the focus pointer 227, when an image is captured while looking at the focus display bar 225 displayed on the display unit 20, the user can easily tell which way to turn the focus ring 67 when adjusting the object distance of the optical system L. Consequently, the camera is easier to operate even with a display format such as the focus display bar 225.

Also, just as with the focus display bar 205, with the focus display bar 225 the current object distance is expressed by the length of the display stripe 226, so the user can intuitively gauge the current object distance by looking at the focus display bar 225.

In particular, the rotation direction of the focus ring 67 will be even easier to ascertain than with the linear focus display bar 205 since the arc-shaped focus display bar 225 is such that the rotation direction of the focus ring 67 coincides completely with the rotation direction of the focus pointer 227.

The focus display bar 225 here is arc-shaped, but the same effect will be obtained if the focus display bar 225 is annular in shape.

The focus display bars 205 and 225 do not need to be displayed at all times on the display unit 20, and the constitution may be such that the focus display bars 205 and 225 are displayed when the mode is changed to manual focus mode or when the second rotation detector 68 detects the rotational operation of the focus ring 67, and the display of the focus display bars 205 and 225 is automatically cancelled when the rotational operation of the focus ring 67 is ended.

Other Embodiments (1)

In the modification examples given above, the absolute value of the rotational angle of the zoom ring 64 and the absolute value of the rotational angle of the zoom pointer 127 may be made to coincide. Also, the absolute value of the rotational angle of the focus ring 67 and the absolute value of the rotational angle of the focus pointer 227 may be made to coincide. In these cases, the amount the zoom ring 64 or the focus ring 67 is operated can be readily ascertained by the user, which makes the camera easier to operate.

(2)

In the above embodiment, the maximum value 108a and minimum value 108b of the focal length were displayed on the zoom display bar 105, for example, but the maximum value 108a and minimum value 108b of the focal length do not need to be displayed on the zoom display bar 105 for the user to learn which way to turn the zoom ring 64. For instance, since all the user needs to know is the directions in which the focal length increases and decreases, the minimum value 108b may be displayed as "Min" and the maximum value 108a as "Max." Alternatively, the minimum value 108b may be displayed as "Low" and the maximum value 108a as "High."

A display other than that of the minimum value and maximum value may similarly be used for the zoom display bar 125, the focus display bar 205, and the focus display bar 225.

(3)

As to the display of focal length information, a display based on the size of the imaging sensor 11, or a display of 35 mm conversion of silver halide film is also possible. The display format can be switched by the user.

(4)

In the above embodiment, the focal length variable range of the interchangeable lens unit 2 was from 14 to 50 mm, but the focal length variable range is not limited to these numbers. As discussed above, when an interchangeable lens unit with a different focal length variable range, such as a telephoto lens or a wide angle lens, is attached to the camera body 3, the display range of the zoom display bars 105 and 125 are varied on the basis of the individual focal length information stored in the memory of the interchangeable lens unit.

(5)

In the above embodiment, a format in which the rotation of the zoom ring 64 was transmitted mechanically to the various support frames was employed for the lens support mechanism 45, but the drive format of the zoom mechanism is not limited to this, although the focal length varies. The drive format of the zoom mechanism may be, for example, an electrical power zoom. In this case, the focal length may be varied by detecting the rotation direction and rotational angle of the zoom ring 64 with the first rotation detector 65, and driving the zoom lens group (such as the first lens group L1) in the Z axis direction by an actuator (not shown) according to the rotation of the zoom ring 64.

(6)

The display unit 20 described in the above embodiment was fixed to the case 3a of the camera body 3, but it is also possible to use a movable type of display unit. In this case, the angle of the display unit with respect to the case 3a can be varied, so the disposition of the zoom display bar or focus display bar displayed on the display unit can be optimized according to the orientation of the display unit.

Also, in the above embodiment, the imaging orientation of the digital camera 1 was described as being the landscape orientation shown in FIG. 3, but portrait orientation is also possible, in which the digital camera 1 is rotated by 90° clockwise or counter-clockwise around the optical axis AZ. In this case, the zoom display bar 105 or the focus display bar 205 may also be rotated to match the orientation of the digital camera 1 so that the zoom display bar 105 or focus display bar 205 is easier to read, which is accomplished by identifying the orientation of the digital camera 1 with an orientation detecting sensor installed in the interchangeable lens unit 2 or the camera body 3. Here, the display length of the zoom display bar 105 or the focus display bar 205 may be adjusted by the body microcomputer 10 according to the aspect ratio of the display unit 20. Similarly, with the zoom display bar 125 and the focus display bar 225, the disposition and dimensions may be automatically adjusted according to the orientation of the digital camera 1.

As to the display position of the zoom display bar 105 within the display unit 20, a position where the main subject and the zoom display bar 105 do not overlap (or overlap hardly at all) may be detected from a live image acquired by the imaging sensor 11, and the zoom display bar 105 automatically disposed at that position. What is known as face detection technology, for example, can be used to detect the range of the main subject. This constitution can be applied to the zoom display bar 125 and to the focus display bars 205 and 225.

(7)

In the above embodiment, an ultrasonic actuator was used as the actuator for adjusting focus, but the focus actuator may be some other kind of actuator, such as a stepping motor.

(8)

In the above embodiment, the description was mainly about still photography, but everything can be carried out similarly for moving picture photography. In the case of moving picture photography, to maintain the focus state, the second lens group L2 is constantly wobbled (microscopically vibrated back and forth) in the Z axis direction by contrast detection method.

(9)

In the above embodiment, the second lens group L2 served as a focus lens group, but other options are also possible, such as using the third lens group L3, the fourth lens group L4, or another lens group as the focus lens group. Also, a case was described in which a single second lens group L2 was used as a focus lens group, but the optical system may instead be one in which focus is adjusted jointly by a plurality of lens groups.

(10)

A blur correction unit may be provided to the digital camera 1 to suppress degradation of the produced image by shaking of the camera body 3 or the interchangeable lens unit 2. This blur correction unit may be provided inside either the interchangeable lens unit or the camera body. Alternatively, blur corrections unit may be provided to both the interchangeable lens unit and the camera body. In this case, the constitution may be such that the user can select to use either of the blur correction units.

(11)

The reflecting mirror employed in conventional single lens reflex cameras was not installed in the digital camera 1 in the above embodiment, but the camera may be a conventional type of single lens reflex camera that is equipped with a reflecting mirror. In this case, the camera can be used in substantially the same way as in the above embodiment by retracting the reflecting mirror to outside the optical path, and performing contrast detection autofocusing with the imaging sensor 11.

(12)

In the above embodiment, an interchangeable lens type of digital camera was described as an example, but as long as a control member for manual zooming or focusing is provided, it is also possible to use the zoom display bar 105 or another such state indicator for a digital camera in which the camera body and the lens barrel are integrated. In this case, an optical system may be used in which a reflective optical system such as a prism or mirror is disposed along the optical axis AZ and the optical path is bend along the way (this is known as a bent optical system).

Also, the zoom ring 64 and the focus ring 67 need not be ring-shaped members.

(13)

In the above embodiment, the exposure time of the imaging sensor 11 was controlled by operating a shutter, but other options are also possible, and the exposure time of the imaging sensor 11 may be controlled with an electronic shutter or the like.

(14)

In the above embodiment, the focal position was said given in meters, but may instead be given in feet. Also, the configuration may be such that the user can switch these display formats. To make things easier for the user, the focus display bars 205 and 225 may be such that the spacing between graduations from the near to infinity can be set as desired.

(15)

In the above embodiment, the object distance variable range of the interchangeable lens unit 2 was from 0.3 m to infinity, but the object distance variable range is not limited to these values. As discussed above, the display range of the focus display bars 205 and 225 vary on the basis of the individual object distance information stored in the memory of the interchangeable lens unit. Therefore, when an interchangeable lens unit such as a macro lens is attached, with which the shortest imaging distance is only 0.1 m, for example, then the display range of the focus display bars 205 and 225 will be from 0.1 m to infinity.

(16)

With the second embodiment above, the optical system L may be an optical system with a single focus length, rather than a zoom lens system with which the focal length can be varied. When an interchangeable lens unit 2 having a single focus length optical system is attached, only the focus display bars 205 and 225 may be displayed, and not the zoom display bars 105 and 125.

Industrial Applicability

The camera body according to the present invention is favorable in interchangeable lens-type digital cameras, integrated digital still cameras, digital video cameras, portable telephones and PDA's equipped with a camera function, and so forth where greater ease of operation is desirable.

The invention claimed is:

1. A camera body used in an imaging device along with a lens barrel with which the state of an optical system can be varied by operating a rotatably provided operation member, said camera body comprising:
   a display unit configured to display a state indicator that expresses the state of the optical system; and
   a control unit configured to control the display unit so that an operation direction in which the operation member works when the user operates the operation member substantially coincides with a change direction in which the state indicator displayed on the display unit changes according to the operation of the operation member, wherein
   the lens barrel further has a memory unit configured to store lens information,
   the lens information includes operation direction information expressing the relation between the operation direction and the change in the state of the optical system,
   the control unit is configured to acquire the lens information from the memory unit, and is configured to determine a display state of the state indicator displayed on the display unit on the basis of the operation direction information included in the lens information,
   the state indicator is configured to express the focal length of the optical system,
   the control unit is configured to control the display unit so that the operation direction in which the focal length increases or decreases substantiall coincides with the change direction in which the state indicator changes according to the increase or decrease in the focal length,
   the operation direction information is configured to express the relation between the operation direction and the increase or decrease in the focal length,
   the lens information further includes focal length information that expresses the range over which the focal length of the optical system can be varied,
   the state indicator has a display meter that expresses the focal length information,
   the control unit is configured to determine the disposition of the focal length information on the display meter on the basis of the operation direction information,
   the state indicator has an pointer whose position with respect to the display meter varies according to changes in the focal length of the optical system,
   the pointer is configured to represent the focal length,
   the control unit is configured to control the display unit so that the operation direction in which the focal length increases substantially coincides with the direction in which the pointer moves with respect to the display meter when the object distance represented by the pointer increases,
   the display meter is arc-shaped or annular,
   the control unit is configured to control the display unit so that the pointer rotates along the display meter and around a specific reference point when there is a change in the focal length, and
   the state indicator is such that the absolute value of the rotational angle of the operation member coincides with the absolute value of the angle at which the pointer rotates around the reference point.

2. The camera body according to claim 1, wherein
   the control unit is configured to determine the disposition of the focal length information on the display meter on the basis of the position of the state indicator in the display unit.

3. The camera body according to claim 1, wherein
   the display meter is linear, and
   the control unit is configured to control the display unit so that the pointer moves linearly along the display meter when there is a change in the focal length.

4. The camera body according to claim 1, wherein
   the pointer and the display meter are arranged to form a display stripe, and
   the length of the display stripe is configured to represent the focal length.

5. The camera body according to claim 1, wherein
   the state indicator is configured to represent the object distance of the optical system when in focus, and
   the control unit is configured to control the display unit so that the operation direction in which the object distance of the optical system is increased or decreased substantially coincides with the change direction in which the state indicator changes according to the increase or decrease in the object distance.

6. The camera body according to claim 5,
   wherein the operation direction information expresses the relation between the operation direction of the operation member and the increase or decrease in the object distance.

7. The camera body according to claim 5, wherein
the lens information further includes object distance information expressing the range over which the object distance of the optical system can be varied,
the state indicator has a display meter configured to show the object distance information, and
the control unit is configured to determine the disposition of the object distance information on the display meter on the basis of the operation direction information.

8. The camera body according to claim 7, wherein
the control unit is configured to determine the disposition of the object distance information on the display meter on the basis of the position of the state indicator in the display unit.

9. The camera body according to claim 7, wherein
the state indicator has an pointer whose position with respect to the display meter changes according to changes in the object distance,
the pointer is configured to represent the object distance of the optical system, and
the control unit is configured to control the display unit so that the operation direction in which the object distance increases substantially coincides with the direction in which the pointer moves with respect to the display meter when the object distance represented by the pointer increases.

10. The camera body according to claim 9, wherein
the display meter is linear, and
the control unit is configured to control the display unit so that the pointer moves linearly along the display meter when there is a change in the object distance.

11. The camera body according to claim 9, wherein
the display meter is arc-shaped or annular, and
the control unit is configured to control the display unit so that the pointer rotates along the display meter and around a specific reference point when there is a change in the object distance.

12. The camera body according to claim 11, wherein
the state indicator is such that the rotational angle of the operation member coincides with the angle at which the pointer rotates around the reference point.

13. The camera body according to claim 9, wherein
the pointer and the display meter are arranged to form a display stripe, and
the length of the display stripe is configured to represent the focal length.

14. An imaging device, comprising:
a lens barrel having a rotatably provided operation member, an optical system configured to form an optical image of a subject, and a state varying unit configured to change the state of the optical system according to the operation of the operation member; and
the camera body according to claim 1.

15. A camera body used in an imaging device along with a lens barrel with which the state of an optical system can be varied by operating a rotatably provided operation member, said camera body comprising:
a display unit configured to display a state indicator that expresses the state of the optical system; and
a control unit configured to control the display unit so that an operation direction in which the operation member works when the user operates the operation member substantially coincides with a change direction in which the state indicator displayed on the display unit changes according to the operation of the operation member, wherein
the lens barrel further has a memory unit configured to store lens information,
the lens information includes operation direction information expressing the relation between the operation direction and the change in the state of the optical system,
the control unit is configured to acquire the lens information from the memory unit, and is configured to determine a display state of the state indicator displayed on the display unit on the basis of the operation direction information included in the lens information,
the state indicator is configured to express the focal length of the optical system,
the control unit is configured to control the display unit so that the operation direction in which the focal length increases or decreases substantially coincides with the change direction in which the state indicator changes according to the increase or decrease in the focal length,
the lens information further includes focal length information that expresses the range over which the focal length of the optical system can be varied,
the state indicator has a display meter that expresses the focal length information,
the control unit is configured to determine the disposition of the focal length information on the display meter on the basis of the operation direction information,
the state indicator has an pointer whose position with respect to the display meter varies according to changes in the focal length of the optical system,
the pointer is configured to represent the focal length,
the control unit is configured to control the display unit so that the operation direction in which the focal length increases substantially coincides with the direction in which the pointer moves with respect to the display meter when the object distance represented by the pointer increases,
the pointer and the display meter are arranged to form a display stripe, and
the length of the display stripe is configured to represent the focal length.

16. A camera body used in an imaging device along with a lens barrel with which the state of an optical system can be varied by operating a rotatably provided operation member, said camera body comprising:
a display unit configured to display a state indicator that expresses the state of the optical system; and
a control unit configured to control the display unit so that an operation direction in which the operation member works when the user operates the operation member substantially coincides with a change direction in which the state indicator displayed on the display unit changes according to the operation of the operation member, wherein,
the lens barrel further has a memory unit configured to store lens information,
the lens information includes operation direction information expressing the relation between the operation direction and the change in the state of the optical system,
the control unit is configured to acquire the lens information from the memory unit, and is configured to determine a display state of the state indicator displayed on the display unit on the basis of the operation direction information included in the lens information;
the state indicator is configured to represent the object distance of the optical system when in focus, and
the control unit is configured to control the display unit so that the operation direction in which the object distance of the optical system is increased or decreased substantially coincides with the change direction in which the state indicator changes according to the increase or decrease in the object distance;

the lens information further includes object distance information expressing the range over which the object distance of the optical system can be varied, the state indicator has a display meter configured to show the object distance information, the control unit is configured to determine the disposition of the object distance information on the display meter on the basis of the operation direction information, the state indicator has an pointer whose position with respect to the display meter changes according to changes in the object distance, the pointer is configured to represent the object distance of the optical system, the control unit is configured to control the display unit so that the operation direction in which the object distance increases substantially coincides with the direction in which the pointer moves with respect to the display meter when the object distance represented by the pointer increases, the pointer and the display meter are arranged to form a display stripe, and the length of the display stripe is configured to represent the object distance.

* * * * *